(12) United States Patent
Kobayashi et al.

(10) Patent No.: US 11,797,033 B2
(45) Date of Patent: Oct. 24, 2023

(54) TEMPERATURE CONTROL SYSTEM AND TEMPERATURE CONTROL METHOD

(71) Applicant: KELK Ltd., Kanagawa (JP)

(72) Inventors: Atsushi Kobayashi, Kanagawa (JP);
Hideaki Ohkubo, Kanagawa (JP);
Kazuhiro Mimura, Hiratsuka (JP);
Toru Suzuki, Kanagawa (JP)

(73) Assignee: KELK Ltd., Kanagawa (JP)

( * ) Notice: Subject to any disclaimer, the term of this patent is extended or adjusted under 35 U.S.C. 154(b) by 258 days.

(21) Appl. No.: 17/295,311

(22) PCT Filed: Dec. 19, 2019

(86) PCT No.: PCT/JP2019/049944
§ 371 (c)(1),
(2) Date: May 19, 2021

(87) PCT Pub. No.: WO2020/145082
PCT Pub. Date: Jul. 16, 2020

(65) Prior Publication Data
US 2022/0011793 A1    Jan. 13, 2022

(30) Foreign Application Priority Data

Jan. 10, 2019 (JP) .................. 2019-002947
May 31, 2019 (JP) .................. 2019-103038
Nov. 15, 2019 (JP) .................. 2019-206761

(51) Int. Cl.
*G05D 23/13* (2006.01)
*G05D 23/19* (2006.01)

(52) U.S. Cl.
CPC ..... *G05D 23/1393* (2013.01); *G05D 23/1931* (2013.01)

(58) Field of Classification Search
CPC .............. G05D 23/13; G05D 23/1393; G05D 23/1931; G05D 23/1934; H01L 21/67103; H01L 21/678247; H01L 21/68714
See application file for complete search history.

(56) References Cited

U.S. PATENT DOCUMENTS 7,323,127 B2   1/2008  Muranaka et al.
7,527,756 B2   5/2009  Miyagawa et al.
(Continued)

FOREIGN PATENT DOCUMENTS

CN    1928764    3/2007
CN    1994717    7/2007
(Continued)

OTHER PUBLICATIONS

TW Office Action in Taiwan Appln. No. TW108148562, dated Oct. 12, 2020, 16 pages (with English translation).
(Continued)

*Primary Examiner* — Marc E Norman
(74) *Attorney, Agent, or Firm* — Fish & Richardson P.C.

(57) ABSTRACT

To control the temperature of a fluid with high accuracy, a temperature control system is equipped with: a circulation channel including a temperature control target and a tank containing a fluid adjusted to a specified temperature range including a target temperature of the temperature control target; and a first temperature controller that is arranged between the tank and the temperature control target in the circulation channel and that adjusts the temperature of the fluid to be supplied to the temperature control target.

15 Claims, 16 Drawing Sheets

(56) References Cited

U.S. PATENT DOCUMENTS

| | | | |
|---|---|---|---|
| 7,637,315 | B2 | 12/2009 | Ichinose et al. |
| 7,726,145 | B2 | 6/2010 | Nakamura |
| 7,896,254 | B2 | 3/2011 | Goto et al. |
| 3,272,230 | A1 | 9/2012 | Nakamura |
| 9,984,908 | B2 | 5/2018 | Kobayashi et al. |
| 10,429,865 | B2 | 10/2019 | Ono |
| 10,502,508 | B2 | 12/2019 | Hiroki |
| 10,553,463 | B2 | 2/2020 | Kobayashi et al. |
| 2007/0074863 | A1* | 4/2007 | Ichinose ............ G05D 23/192 165/247 |
| 2008/0314564 | A1 | 12/2008 | Nagaseki et al. |
| 2010/0116484 | A1 | 5/2010 | Kokubo et al. |
| 2013/0014505 | A1 | 1/2013 | Enokijima et al. |
| 2014/0262199 | A1 | 9/2014 | Kobayashi et al. |
| 2014/0374059 | A1 | 12/2014 | Lee et al. |
| 2018/0231291 | A1 | 8/2018 | Kita et al. |

FOREIGN PATENT DOCUMENTS

| | | |
|---|---|---|
| CN | 101739036 | 6/2010 |
| CN | 102822491 | 12/2012 |
| CN | 103930843 | 7/2014 |
| CN | 106765436 A | 5/2017 |
| CN | 108076653 | 5/2018 |
| JP | 2006200814 A | 8/2006 |
| JP | 2007-40569 | 2/2007 |
| JP | 2008-64404 | 3/2008 |
| JP | 2013-105359 | 5/2013 |
| JP | 2014-229811 | 8/2014 |
| JP | 2014-229811 | 12/2014 |
| KR | 20140089536 A | 7/2014 |
| TW | 339403 | 9/1998 |
| TW | 200526393 | 8/2005 |
| TW | 200619890 | 6/2006 |
| TW | 200728670 | 8/2007 |
| TW | 200842539 | 11/2008 |
| TW | 201612488 | 4/2016 |
| TW | 201723714 | 7/2017 |
| TW | 201729944 | 9/2017 |
| WO | WO01/32007 | 5/2001 |

OTHER PUBLICATIONS

PCT International Search Report in International Appln. No. PCT/JP2019/049944, dated Mar. 17, 2020, 2 pages.

Office Action in Chinese Appln. No. 201980081285.7, dated Nov. 3, 2021, 28 pages (with English translation).

* cited by examiner

FIG.7

| Tout-Tin | OPENING DEGREE OF HEAT EXCHANGER PROPORTIONAL VALVE |
|---|---|
| 0.0-2.0 | SMALL ↑ |
| 2.1-3.0 | |
| 3.1-4.0 | ↕ |
| 4.1-5.0 | ↓ |
| 5.1-7.0 | LARGE |

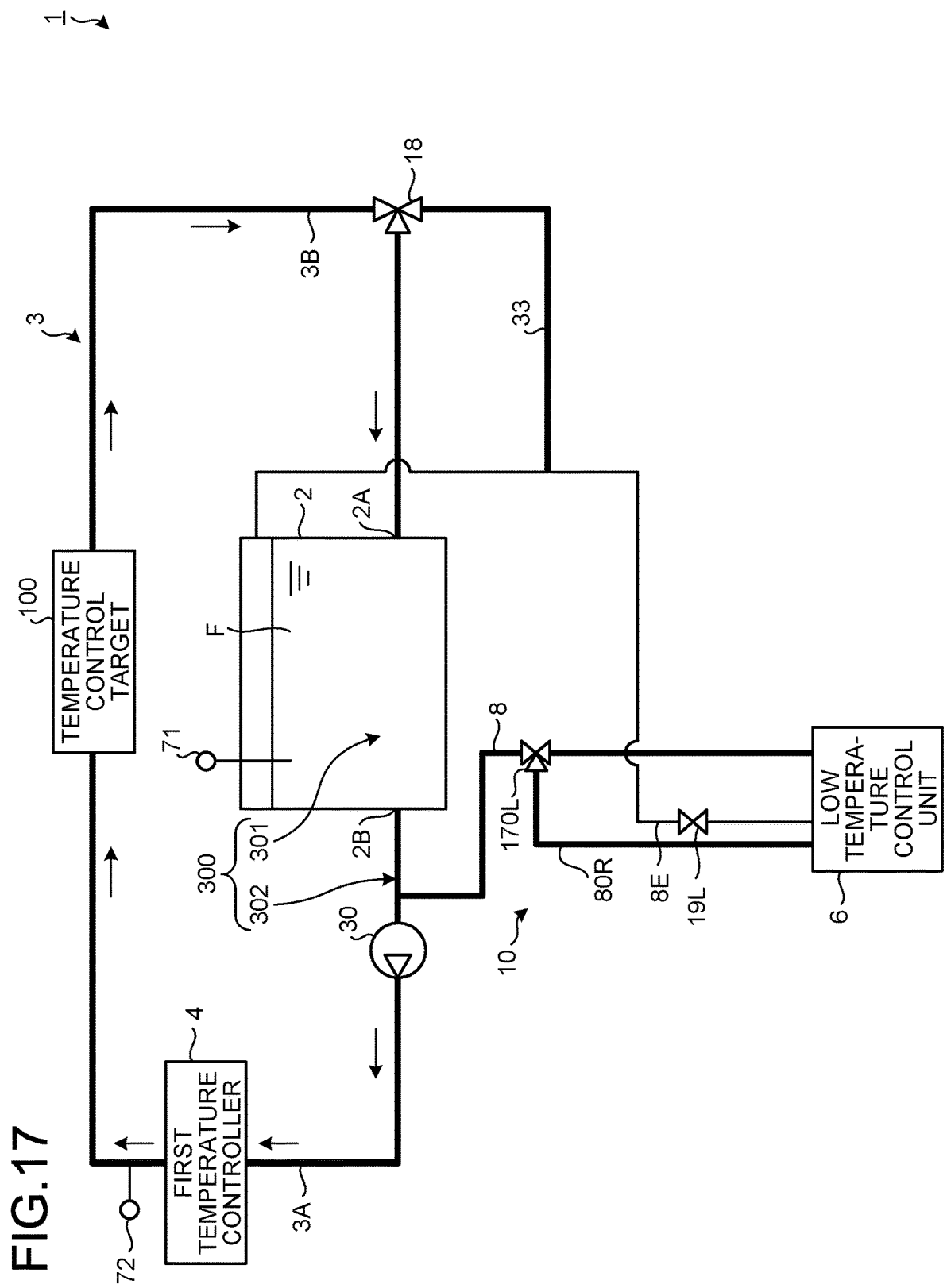

TEMPERATURE CONTROL SYSTEM AND TEMPERATURE CONTROL METHOD

CROSS-REFERENCE TO RELATED APPLICATIONS

This application is a National Stage application of International Application No. PCT/JP2019/049944, filed on Dec. 19, 2019, which claims priority to Japanese Patent Application No. 2019-206761, filed on Nov. 5, 2019, Japanese Patent Application No. 2019-103038, filed on May 31, 2019, and Japanese Patent Application No. 2019-002947, filed on Jan. 10, 2019. The contents of the prior applications are incorporated herein in their entirety.

FIELD

The present invention relates to a temperature control system and a temperature control method.

BACKGROUND

In the technical field related to a semiconductor manufacturing device, a temperature control system as disclosed in Patent Literature 1 is used.

CITATION LIST

Patent Literature

Patent Literature 1: 2013-105359 A

SUMMARY

Technical Problem

The temperature control system disclosed in Patent Literature 1 controls the valve opening degree of a variable valve to adjust the temperature of the fluid. A failure in high accuracy control of the valve opening degree of the variable valve might lead to a failure in high accuracy control of the temperature of the fluid. For example, an occurrence of a control delay of the variable valve makes it difficult to control the temperature of the fluid with high accuracy.

An aspect of the present invention is to control the temperature of a fluid with high accuracy.

Solution to Problem

According to an aspect of the present invention, a temperature control system comprises: a circulation channel including a temperature control target and a tank containing a fluid adjusted to a specified temperature range including a target temperature of the temperature control target; and a first temperature controller that is arranged between the tank and the temperature control target in the circulation channel and that adjusts a temperature of the fluid to be supplied to the temperature control target.

Advantageous Effects of Invention

According to an aspect of the present invention, the temperature of the fluid can be controlled with high accuracy.

BRIEF DESCRIPTION OF DRAWINGS

FIG. 7 is a diagram illustrating operations of a second temperature controller according to the first embodiment.

FIG. 17 is a configuration diagram illustrating a temperature control system according to a seventh embodiment.

DESCRIPTION OF EMBODIMENTS

Hereinafter, embodiments according to the present invention will be described with reference to the drawings, but the present invention is not limited to the embodiments. The constituents described in the embodiments below can be appropriately combined with each other. In some cases, a portion of the constituents is not utilized.

First Embodiment

Temperature Control System

Figure 1:
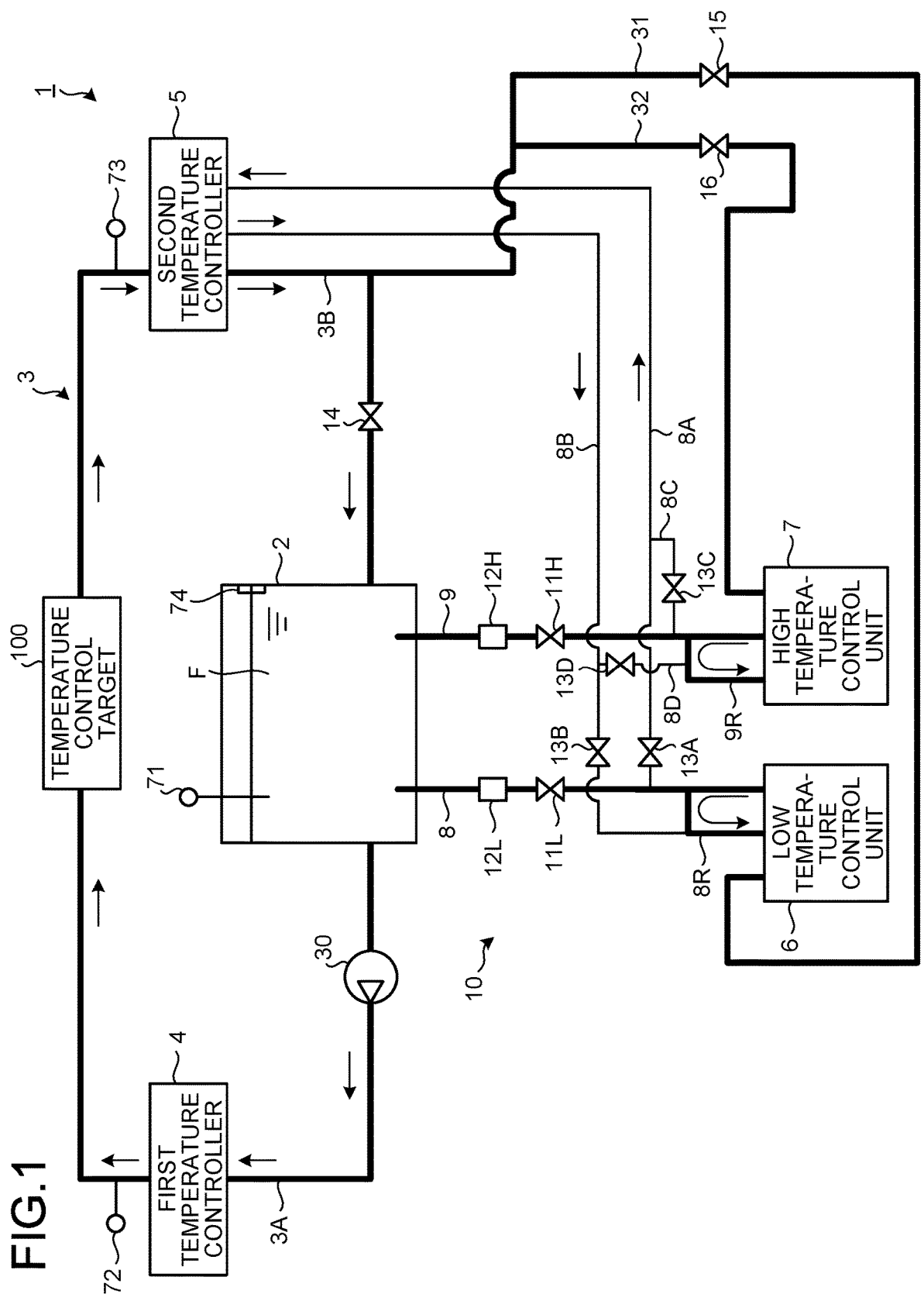
FIG. 1 is a configuration diagram illustrating a temperature control system according to a first embodiment.
Figure 2:
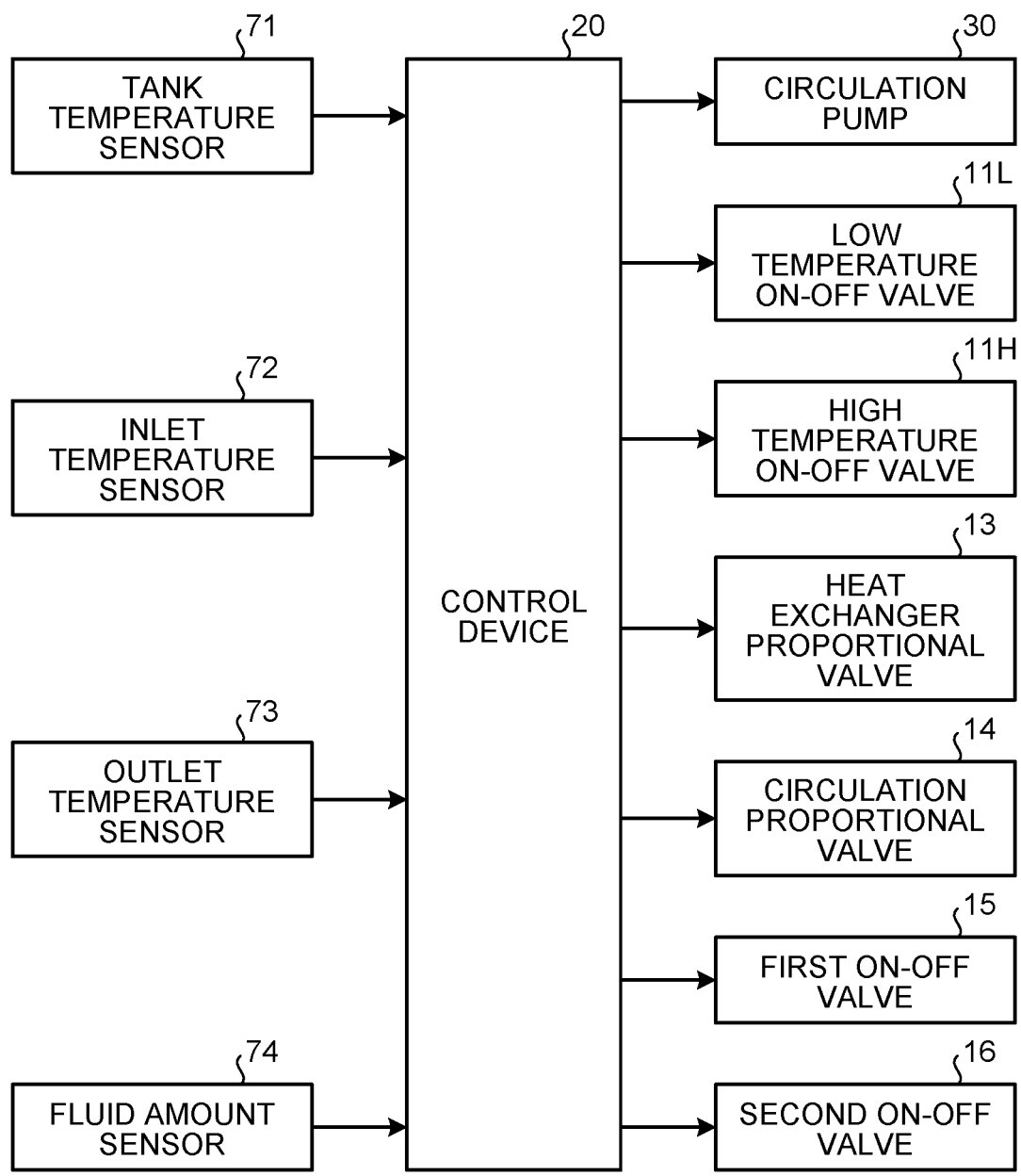
FIG. 2 is a block diagram illustrating the temperature control system according to the first embodiment.

FIG. 1 is a configuration diagram illustrating a temperature control system 1 according to the present embodiment. FIG. 2 is a block diagram illustrating the temperature control system 1 according to the present embodiment. As illustrated in FIGS. 1 and 2, the temperature control system 1 is equipped with a circulation channel 3 including a temperature control target 100 and a tank 2 containing a fluid F adjusted to a specified temperature range Sm including a target temperature Sr of the temperature control target 100, a first temperature controller 4 that is arranged between the tank 2 and the temperature control target 100 in the circulation channel 3 and that adjusts the temperature of the fluid F to be supplied to the temperature control target 100, and a second temperature controller 5 that is arranged between the temperature control target 100 and the tank 2 in the circulation channel 3 and that adjusts the temperature of the fluid F to be supplied to the tank 2.

Furthermore, the temperature control system 1 further includes a low temperature control unit 6 that stores the fluid F of a first temperature $T_1$, a high temperature control unit 7 that stores the fluid F of a second temperature $T_2$ higher than the first temperature $T_1$, a low temperature channel 8 through which the fluid F supplied from the low temperature control unit 6 to the tank 2 flows, a high temperature channel 9 through which the fluid F supplied from the high temperature control unit 7 to the tank 2 flows, a valve system 10 capable of switching the flow state of the fluid F from the low temperature control unit 6 and the high temperature control unit 7 to the tank 2, and a control device 20 that controls the temperature control system 1.

The temperature control target 100 includes at least a part of a semiconductor manufacturing device. The temperature control target 100 includes a wafer holder of a plasma processing device, for example. The wafer holder holds a semiconductor wafer that undergoes plasma processing in the plasma processing device. The wafer holder is formed of aluminum, for example. The wafer holder has an electrostatic chuck that holds a semiconductor wafer by electrostatic attraction. The electrostatic chuck attracts and holds the semiconductor wafer by Coulomb force generated by application of DC voltage. By controlling the temperature of the wafer holder, the temperature of the semiconductor wafer held in the wafer holder is adjusted.

The temperature control system 1 supplies the fluid F to the temperature control target 100 to control the temperature of the temperature control target 100. In the present embodiment, the fluid F is a liquid. The fluid F may be a gas.

The tank 2 houses the fluid F. The tank 2 contains the fluid F having a temperature adjusted to the specified temperature range Sm including the target temperature Sr of the temperature control target 100. A tank temperature $T_p$, which indicates the temperature of the fluid F contained in the tank 2, is detected by a tank temperature sensor 71.

The circulation channel 3 includes a first portion 3A through which the fluid F supplied from the tank 2 to the temperature control target 100 flows, and a second portion 3B through which the fluid F supplied from the temperature control target 100 to the tank 2 flows. A circulation pump 30 is arranged in the first portion 3A. The circulation pump 30 is driven to allow the fluid F to circulate through the circulation channel 3.

The first temperature controller 4 is arranged in the first portion 3A. The first temperature controller 4 adjusts the temperature of the fluid F supplied from the tank 2 to the temperature control target 100. In the present embodiment, the first temperature controller 4 includes a thermoelectric module 60. An inlet temperature $T_{in}$, which indicates the temperature of the fluid F flowing into the temperature control target 100 after the temperature is adjusted by the first temperature controller 4, is detected by an inlet temperature sensor 72.

Figure 3:
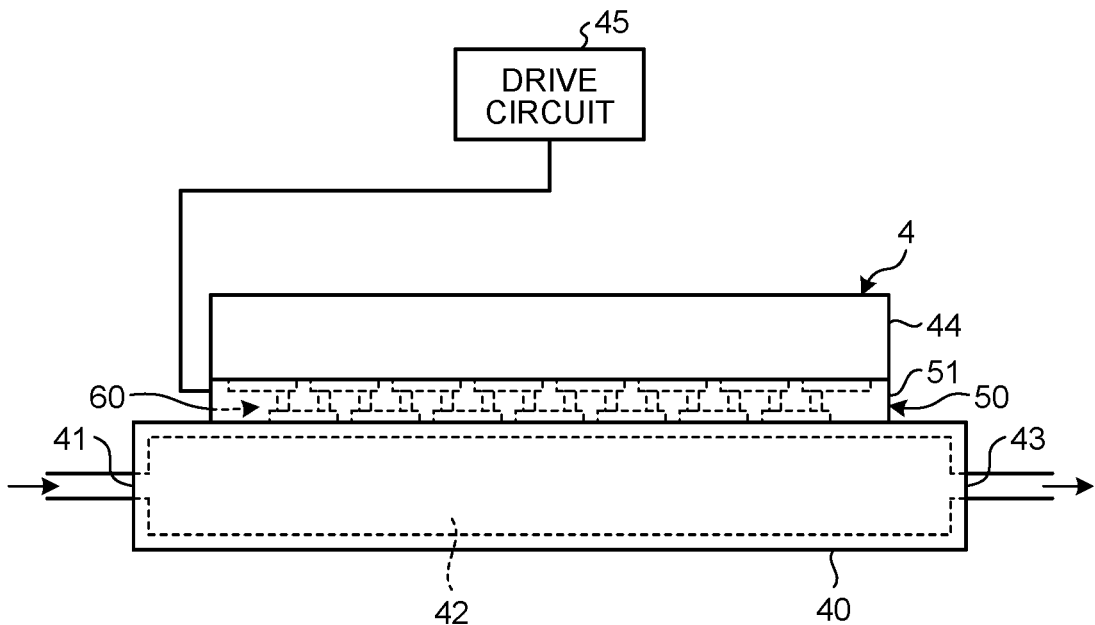
FIG. 3 is a diagram schematically illustrating an example of a first temperature controller according to the first embodiment.

FIG. 3 is a diagram schematically illustrating an example of the first temperature controller 4 according to the present embodiment. As illustrated in FIG. 3, the first temperature controller 4 includes a main body member 40 having a temperature control channel 42, a temperature control section 50 connected to the main body member 40, a heat exchange plate 44 connected to the temperature control section 50, and a drive circuit 45 that drives the temperature control section 50.

The temperature control channel 42 is provided inside the main body member 40. The fluid F from the tank 2 flows into the temperature control channel 42 through an inlet 41. The fluid F that has passed through the temperature control channel 42 flows out from the temperature control channel 42 through an outlet 43. The fluid F flowing out of the temperature control channel 42 is supplied to the temperature control target 100.

The temperature control section 50 adjusts the temperature of the fluid F flowing through the temperature control channel 42, via the main body member 40. The temperature control section 50 includes the thermoelectric module 60. The temperature control section 50 adjusts the temperature of the fluid F by using the thermoelectric module 60.

The thermoelectric module 60 absorbs heat or emits heat to adjust the temperature of the fluid F flowing through the temperature control channel 42. The thermoelectric module 60 absorbs heat or emits heat by supplied electric power. The thermoelectric module 60 absorbs heat or emits heat due to the Peltier effect.

The heat exchange plate 44 exchanges heat with the temperature control section 50. The heat exchange plate 44 includes an internal channel (not illustrated) through which the temperature control medium flows. After undergoing a temperature adjustment performed by a medium temperature control device (not illustrated), the temperature control medium flows into the internal channel of the heat exchange plate 44. The temperature control medium flows through the internal channel to take heat from the heat exchange plate 44 or apply heat to the heat exchange plate 44. The temperature control medium flows out of the internal channel and is returned to the fluid temperature control device.

Figure 4:
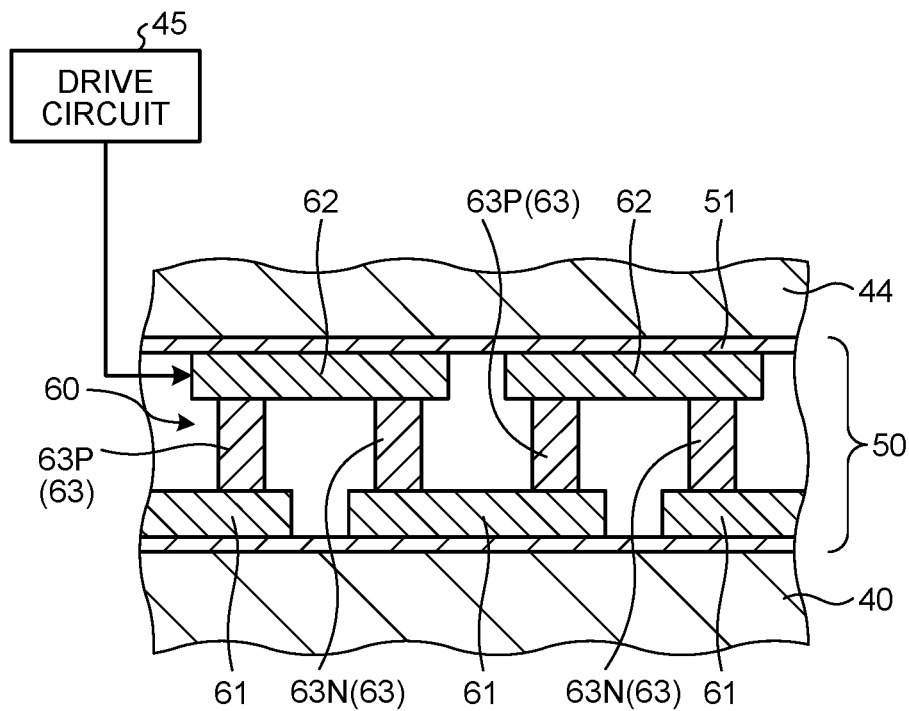
FIG. 4 is an enlarged cross-sectional view of a part of a temperature control section according to the first embodiment.

FIG. 4 is an enlarged cross-sectional view of a part of the temperature control section 50 according to the present embodiment. As illustrated in FIG. 4, the temperature control section 50 includes a plurality of thermoelectric modules 60 and a case 51 that houses the plurality of thermoelectric modules 60. One end surface of the case 51 and the main body member 40 are connected. The other end surface of the case 51 and the heat exchange plate 44 are connected.

The thermoelectric module 60 includes a first electrode 61, a second electrode 62, and a thermoelectric semiconductor element 63. The thermoelectric semiconductor element 63 includes a p-type thermoelectric semiconductor element 63P and an n-type thermoelectric semiconductor element 63N. The first electrode 61 is connected to each of the p-type thermoelectric semiconductor element 63P and the n-type thermoelectric semiconductor element 63N. The second electrode 62 is connected to each of the p-type thermoelectric semiconductor element 63P and the n-type thermoelectric semiconductor element 63N. The first electrode 61 is adjacent to the main body member 40. The second electrode 62 is adjacent to the heat exchange plate 44. One end face of the p-type thermoelectric semiconductor element 63P and one end face of the n-type thermoelectric semiconductor element 63N are individually connected to the first electrode 61. The other end face of the p-type thermoelectric semiconductor element 63P and the other end face of the n-type thermoelectric semiconductor element 63N are individually connected to the second electrode 62.

The thermoelectric module 60 absorbs heat or emits heat due to the Peltier effect. The drive circuit 45 supplies the thermoelectric module 60 with electric power for allowing the thermoelectric module 60 to absorb or emit heat. The drive circuit 45 provides a potential difference between the first electrode 61 and the second electrode 62. When a potential difference is given between the first electrode 61 and the second electrode 62, electric charges move in the thermoelectric semiconductor element 63. Due to the transfer of electric charge, heat is transferred in the thermoelectric semiconductor element 63. This allows the thermoelectric module 60 to absorb heat or emit heat. For example, when a potential difference is given between the first electrode 61 and the second electrode 62 so that the first electrode 61 emits heat and the second electrode 62 absorbs heat, the fluid F flowing through the temperature control channel 42 will be heated. When a potential difference is given between the first electrode 61 and the second electrode 62 so that the first electrode 61 absorbs heat and the second electrode 62 emits heat, the fluid F flowing through the temperature control channel 42 will be cooled.

The drive circuit 45 gives electric power (potential difference) to the thermoelectric module 60. The drive circuit 45 is controlled by the control device 20. By adjusting the electric power given to the thermoelectric module 60, the amount of heat absorbed or the amount of heat emitted by the thermoelectric module 60 is adjusted. By adjusting the amount of heat absorbed or the amount of heat emitted by the thermoelectric module 60, the temperature of the fluid F flowing through the temperature control channel 42 is adjusted.

The second temperature controller 5 is a heat exchanger. The second temperature controller 5 is arranged in the second portion 3B. The second temperature controller 5 adjusts the temperature of the fluid F supplied from the temperature control target 100 to the tank 2. An outlet temperature $T_{out}$, which indicates a temperature of the fluid F flowing out of the temperature control target 100 and before being supplied to the second temperature controller 5, is detected by an outlet temperature sensor 73.

The circulation channel 3 between the second temperature controller 5 and the tank 2 is provided with a circulation proportional valve 14. The circulation proportional valve 14 is controlled by the control device 20. The control device 20 can control the circulation proportional valve 14 to switch between supplying and stopping the fluid F from the second temperature controller 5 to the tank 2 and to adjust the flow rate of the fluid F supplied from the second temperature controller 5 to the tank 2.

The low temperature control unit 6 stores the fluid F of the first temperature $T_1$. The low temperature control unit 6 can deliver the fluid F of the first temperature $T_1$ to the tank 2. The low temperature control unit 6 includes a low temperature tank, a low temperature controller, and a low temperature pump that delivers the fluid F. The low temperature controller includes a heat exchanger. The low temperature controller adjusts the temperature of the fluid F to the first temperature $T_1$. The fluid F adjusted to the first temperature $T_1$ is stored in the low temperature tank. An example of the first temperature $T_1$ is 5° C.

The high temperature control unit 7 stores the fluid F of the second temperature $T_2$ higher than the first temperature $T_1$. The high temperature control unit 7 can deliver the fluid F of the second temperature $T_2$ to the tank 2. The high temperature control unit 7 includes a high temperature tank, a high temperature controller, and a high temperature pump that delivers the fluid F. The high temperature controller includes a heat exchanger. The high temperature controller adjusts the temperature of the fluid F to the second temperature $T_2$. The fluid F adjusted to the second temperature $T_2$ is stored in the high temperature tank. An example of the second temperature $T_2$ is 85° C.

The low temperature channel 8 connects the low temperature control unit 6 and the tank 2 with each other. The low temperature control unit 6 can supply the fluid F of the first temperature $T_1$ to the tank 2 via the low temperature channel 8. The fluid F supplied from the low temperature control unit 6 to the tank 2 flows through the low temperature channel 8.

The high temperature channel 9 connects the high temperature control unit 7 and the tank 2 with each other.

The high temperature control unit 7 can supply the fluid F of the second temperature $T_2$ to the tank 2 via the high temperature channel 9. The fluid F supplied from the high temperature control unit 7 to the tank 2 flows through the high temperature channel 9.

The valve system 10 is capable of switching the flow state between a first state in which the fluid F is not supplied to the tank 2 either from the low temperature control unit 6 or the high temperature control unit 7, a second state in which the fluid F is supplied from the low temperature control unit 6 to the tank 2, and a third state in which the fluid F is supplied from the high temperature control unit 7 to the tank 2. The first state is a state in which the fluid F is not supplied to the tank 2 from either the low temperature control unit 6 or the high temperature control unit 7. The second state is a state in which the fluid F of the first temperature $T_1$ is supplied from the low temperature control unit 6 to the tank 2 while the fluid F is not supplied from the high temperature control unit 7 to the tank 2. The third state is a state in which the fluid F of the second temperature $T_2$ is supplied from the high temperature control unit 7 to the tank 2 while the fluid F is not supplied from the low temperature control unit 6 to the tank 2. The valve system 10 is controlled by the control device 20.

The valve system 10 includes a low temperature on-off valve 11L arranged in the low temperature channel 8, a low temperature constant flow valve 12L arranged in the low temperature channel 8, a high temperature on-off valve 11H arranged in the high temperature channel 9, and a high temperature constant flow valve 12H arranged in the high temperature channel 9.

The low temperature on-off valve 11L is a solenoid valve. When the low temperature on-off valve 11L opens, the fluid F of the first temperature $T_1$ is supplied from the low temperature control unit 6 to the tank 2. When the low temperature on-off valve 11L is closed, the supply of the fluid F from the low temperature control unit 6 to the tank 2 is stopped. The low temperature constant flow valve 12L adjusts the flow rate of the fluid F so that the flow rate of the fluid F supplied from the low temperature control unit 6 to the tank 2 becomes a constant flow rate.

The high temperature on-off valve 11H is a solenoid valve. When the high temperature on-off valve 11H opens, the fluid F of the second temperature $T_2$ is supplied from the high temperature control unit 7 to the tank 2. When the high temperature on-off valve 11H is closed, the supply of the fluid F from the high temperature control unit 7 to the tank 2 is stopped. The high temperature constant flow valve 12H adjusts the flow rate of the fluid F so that the flow rate of the fluid F supplied from the high temperature control unit 7 to the tank 2 becomes a constant flow rate.

The control device 20 closes the low temperature on-off valve 11L and the high temperature on-off valve 11H individually when setting the flow state of the fluid F to the first state. With this configuration, the fluid F will not be supplied to the tank 2 either from the low temperature control unit 6 or the high temperature control unit 7.

The control device 20 opens the low temperature on-off valve 11L and closes the high temperature on-off valve 11H when setting the flow state of the fluid F to the second state. With this setting, the fluid F of the first temperature $T_1$ delivered from the low temperature control unit 6 is supplied to the tank 2 at a constant flow rate via the low temperature channel 8.

The control device 20 opens the high temperature on-off valve 11H and closes the low temperature on-off valve 11L when setting the flow state of the fluid F to the third state. With this setting, the fluid F of the second temperature $T_2$ delivered from the high temperature control unit 7 is supplied to the tank 2 at a constant flow rate via the high temperature channel 9.

FIG. 1 illustrates the first state in which the fluid F is not supplied to the tank 2 from either the low temperature control unit 6 or the high temperature control unit 7. In the first state, the fluid F circulates through the circulation channel 3.

In the present embodiment, the temperature control system 1 includes a return channel 8R that connects the low temperature channel 8 and the low temperature control unit 6 with each other at a section between the low temperature on-off valve 11L and the low temperature control unit 6. In the first state and the third state, the fluid F delivered from the low temperature control unit 6 is returned to the low temperature control unit 6 via the return channel 8R. That is, in the first state and the third state, the fluid F circulates through a circulation channel including the low temperature control unit 6 and the return channel 8R.

Similarly, the temperature control system 1 includes a return channel 9R that connects the high temperature channel 9 and the high temperature control unit 7 between the high temperature on-off valve 11H and the high temperature control unit 7. In the first state and the second state, the fluid F delivered from the high temperature control unit 7 is returned to the high temperature control unit 7 via the return channel 9R. That is, in the first state and the second state, the fluid F circulates through a circulation channel including the high temperature control unit 7 and the return channel 9R.

The temperature control system 1 includes: a first bypass channel 31 that connects the second portion 3B of the circulation channel 3 to the low temperature control unit 6; and a second bypass channel 32 that connects the second portion 3B of the circulation channel 3 to the high temperature control unit 7. The first bypass channel 31 includes a first on-off valve 15. The second bypass channel 32 includes a second on-off valve 16. The first on-off valve 15 and the second on-off valve 16 are individually controlled by the control device 20.

The first on-off valve 15 is a solenoid valve. When the first on-off valve 15 opens, the fluid F is supplied from the circulation channel 3 to the low temperature control unit 6. When the first on-off valve 15 is closed, the supply of the fluid F from the circulation channel 3 to the low temperature control unit 6 is stopped.

The second on-off valve 16 is a solenoid valve. When the second on-off valve 16 opens, the fluid F is supplied from the circulation channel 3 to the high temperature control unit 7. When the second on-off valve 16 is closed, the supply of the fluid F from the circulation channel 3 to the high temperature control unit 7 is stopped.

The control device 20 controls the first on-off valve 15 to switch between supplying and stopping the fluid F from the circulation channel 3 to the low temperature control unit 6. Furthermore, the control device 20 controls the second on-off valve 16 to switch between supplying and stopping the fluid F from the circulation channel 3 to the high temperature control unit 7. In the present embodiment, a fluid amount sensor 74 such as a float switch is provided in the tank 2. The control device 20 controls at least one of the first on-off valve 15 or the second on-off valve 16 based on detection data of the fluid amount sensor 74. For example, when it is determined that the amount of the fluid F contained in the tank 2 has increased and the fluid F is about to overflow from the tank 2 based on the detection data of the fluid amount sensor 74, the control device 20 opens one or both of the first on-off valve 15 and the second on-off valve 16. With this control, at least a part of the fluid F contained in the tank 2 will be supplied to one or both of the low temperature control unit 6 and the high temperature control unit 7. This makes it possible to suppress overflow of the fluid F from the tank 2. Furthermore, for example, when the amount of the fluid F stored in the low temperature tank of the low temperature control unit 6 has decreased, the control device 20 can control the first on-off valve 15 to supply the fluid F from the circulation channel 3 to the low temperature tank of the low temperature control unit 6. Similarly, when the amount of the fluid F stored in the high temperature tank of the high temperature control unit 7 has decreased, the control device 20 can control the second on-off valve 16 to supply the fluid F from the circulation channel 3 to the high temperature tank of the high temperature control unit 7.

Note that the low temperature tank of the low temperature control unit 6 may be joined with the high temperature tank of the high temperature control unit 7 by a joint pipe. The fluid F can flow between the low temperature tank and the high temperature tank via the joint pipe. With the presence of the joint pipe, it is possible to achieve matching between the position of the surface of the fluid F stored in the low temperature tank (height of the liquid level) and the position of the surface of the fluid F stored in the high temperature tank (height of the liquid level). Note that a fluid amount sensor such as a float switch may be provided in one or both of the low temperature tank and the high temperature tank. The position of the surface of the fluid F stored in the low temperature tank and the position of the surface of the fluid F stored in the high temperature tank may be controlled based on detection data of the fluid amount sensor. Note that the thickness of the joint pipe joining the low temperature tank and the high temperature tank is preferably thin. With a reduced thickness of the joint pipe, the temperature of the fluid F stored in the low temperature tank is maintained at the first temperature $T_1$ and the temperature of the fluid F stored in the low temperature tank is maintained at the second temperature $T_2$ even when the fluid F flows between the low temperature tank and the high temperature tank via the joint pipe.

In the present embodiment, the first temperature controller 4 adjusts the temperature of the fluid F based on the inlet temperature $T_{in}$. Based on detection data of the inlet temperature sensor 72, the control device 20 controls the drive circuit 45 of the first temperature controller 4 so that the inlet temperature $T_{in}$ of the fluid F to be supplied to the temperature control target 100 becomes the target temperature Sr.

In the present embodiment, the second temperature controller 5 adjusts the temperature of the fluid F from the temperature control target 100 by using the fluid F from the low temperature control unit 6. As described above, the second temperature controller 5 includes a heat exchanger. The second temperature controller 5 is connected to the low temperature control unit 6 via a supply channel 8A and a recovery channel 8B individually. At least a part of the fluid F delivered from the low temperature control unit 6 is supplied to the second temperature controller 5 via the supply channel 8A. The fluid F used for heat exchange in the second temperature controller 5 is returned to the low temperature control unit 6 via the recovery channel 8B. The supply channel 8A is provided with a heat exchanger proportional valve 13A. The heat exchanger proportional valve 13A is controlled by the control device 20. The control device 20 can control the heat exchanger proportional valve 13A to switch between supplying and stopping the fluid F from the low temperature control unit 6 to the second temperature controller 5 and to adjust the flow rate of the fluid F to be supplied from the low temperature control unit 6 to the second temperature controller 5.

Furthermore, the recovery channel 8B is provided with a heat exchanger proportional valve 13B. There is provided a heat exchanger proportional valve 13C in a connection channel 8C that connects the supply channel 8A and the high temperature channel 9 with each other. There is provided a heat exchanger proportional valve 13D in a connection channel 8D that connects the recovery channel 8B and the return channel 9R with each other. The heat exchanger proportional valve 13B, the heat exchanger proportional valve 13C, and the heat exchanger proportional valve 13D are individually controlled by the control device 20. In the following description, it is assumed that the heat exchanger proportional valve 13A is controlled in a state where the heat exchanger proportional valve 13B is open while the heat exchanger proportional valve 13C and the heat exchanger proportional valve 13D are closed.

In the present embodiment, the second temperature controller 5 adjusts the temperature of the fluid F based on a difference $\Delta T$ between the inlet temperature $T_{in}$ and the outlet temperature $T_{out}$. Based on the detection data of the inlet temperature sensor 72 and the detection data of the outlet temperature sensor 73, the control device 20 controls the heat exchanger proportional valve 13A so that the temperature of the fluid F supplied from the temperature control target 100 to the tank 2 falls within the specified temperature range Sm.

When the temperature control target 100 is a wafer holder of a plasma processing device, the temperature control target 100 is used in a high temperature environment. In the present embodiment, the outlet temperature $T_{out}$ is assumed to be higher than the inlet temperature $T_{in}$.

[Operations of Valve System]

Figure 5:
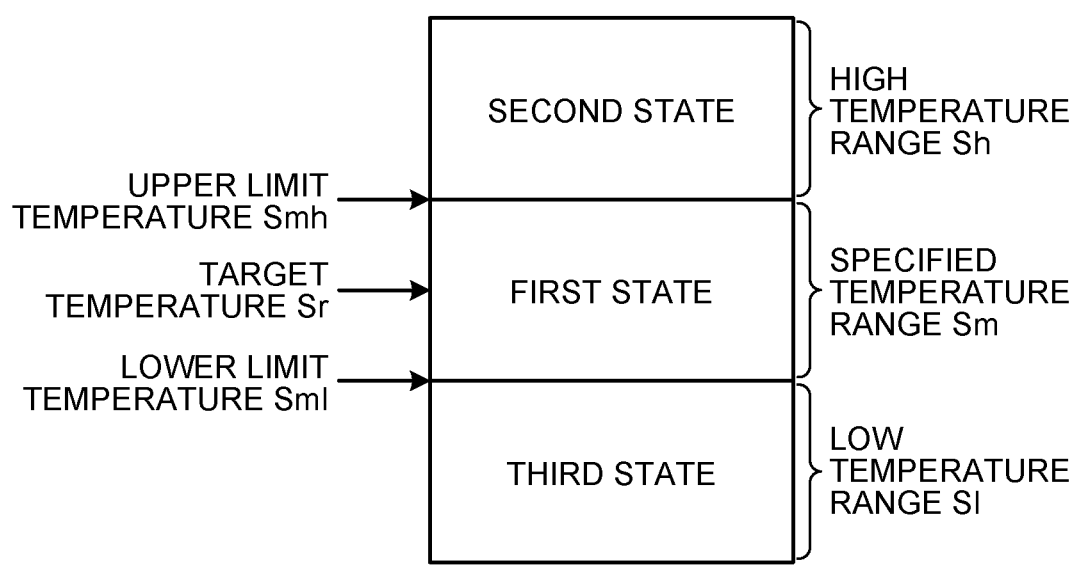
FIG. 5 is a diagram illustrating operations of a valve system according to the first embodiment.

FIG. 5 is a diagram illustrating operations of the valve system 10 according to the present embodiment. As described above, the valve system 10 is capable of switching the flow state between the first state in which the fluid F is not supplied to the tank 2 either from the low temperature control unit 6 or the high temperature control unit 7, the second state in which the fluid F is supplied from the low temperature control unit 6 to the tank 2, and the third state in which the fluid F is supplied from the high temperature control unit 7 to the tank 2.

The valve system 10 switches the flow state between the first state, the second state, and the third state based on the tank temperature $T_p$. The control device 20 controls the low temperature on-off valve 11L and the high temperature on-off valve 11H based on detection data of the tank temperature sensor 71.

In the present embodiment, the valve system 10 switches the flow state of the fluid F to the first state when the tank temperature $T_p$ is within the specified temperature range Sm.

As illustrated in FIG. 5, the specified temperature range Sm includes the target temperature Sr of the temperature control target 100. The specified temperature range Sm is a temperature range between an upper limit temperature Smh and a lower limit temperature Sml lower than the upper limit temperature Smh. The target temperature Sr is the temperature between the upper limit temperature Smh and the lower limit temperature Sml.

That is, when the tank temperature $T_p$ is within the specified temperature range Sm, both the low temperature on-off valve 11L and the high temperature on-off valve 11H are closed, and supply of the fluid F individually from the low temperature control unit 6 and the high temperature control unit 7 to the tank 2 will be stopped. When the tank temperature $T_p$ is within the specified temperature range Sm, the fluid F circulates through the circulation channel 3. The temperature of the fluid F circulating through the circulation channel 3 is adjusted by the first temperature controller 4. Furthermore, as necessary, the temperature of the fluid F circulating through the circulation channel 3 is adjusted by the second temperature controller 5. As will be described below, in the present embodiment, when the difference $\Delta T$ between the inlet temperature $T_{in}$ and the outlet temperature $T_{out}$ is greater than zero (when $[T_{out}-T_{in}>0]$), the temperature of the fluid F circulating through the circulation channel 3 is adjusted by the second temperature controller 5.

The valve system 10 switches the flow state to at least one of the second state or the third state when the tank temperature $T_p$ is not within the specified temperature range Sm.

The valve system 10 switches the flow state of the fluid F to the second state when the tank temperature $T_p$ is in a high temperature range Sh higher than the upper limit temperature Smh of the specified temperature range Sm.

That is, when the tank temperature $T_p$ is in the high temperature range Sh, the low temperature on-off valve 11L opens, the high temperature on-off valve 11H is closed, and the fluid F of the first temperature $T_1$ is supplied from the low temperature control unit 6 to the tank 2. The first temperature $T_1$ is lower than the upper limit temperature Smh. In the present embodiment, the first temperature $T_1$ is lower than the target temperature Sr. The first temperature $T_1$ may be lower than the lower limit temperature Sml. When the tank temperature $T_p$ is in the high temperature range Sh, the fluid F of the first temperature $T_1$ is supplied to the tank 2 so as to adjust the tank temperature $T_p$ to the specified temperature range Sm.

The valve system 10 switches the flow state of the fluid F to the third state when the tank temperature $T_p$ is in a low temperature range Sl lower than the lower limit temperature Sml of the specified temperature range Sm.

That is, when the tank temperature $T_p$ is in the low temperature range Sl, the high temperature on-off valve 11H opens, the low temperature on-off valve 11L is closed, and the fluid F of the second temperature $T_2$ is supplied from the high temperature control unit 7 to the tank 2. The second temperature $T_2$ is higher than the lower limit temperature Sml. In the present embodiment, the second temperature $T_2$ is higher than the target temperature Sr. The second temperature $T_2$ may be higher than the upper limit temperature Smh. When the tank temperature $T_p$ is in the low temperature range Sl, the fluid F of the second temperature $T_2$ is supplied to the tank 2 so as to adjust the tank temperature $T_p$ to the specified temperature range Sm.

[Control Method]

Figure 6:
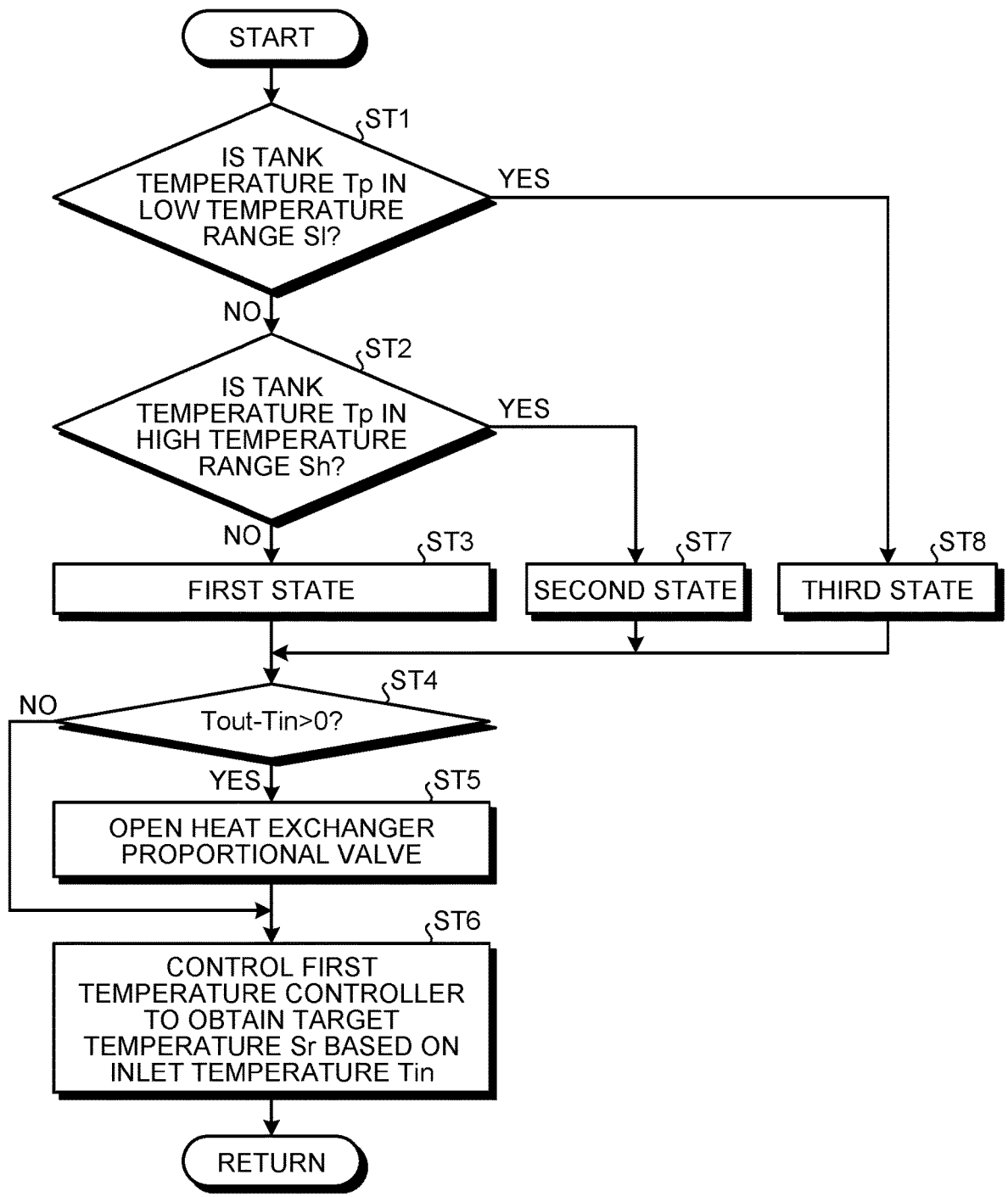
FIG. 6 is a flowchart illustrating a temperature control method according to the first embodiment.

Next, a temperature control method to be applied to the temperature control target 100 according to the present embodiment will be described. FIG. 6 is a flowchart illustrating a temperature control method according to the present embodiment. In the present embodiment, the tank temperature $T_p$ is detected by the tank temperature sensor 71 in the circulation channel 3 including the temperature control target 100 and the tank 2. When the tank temperature $T_p$ is within the specified temperature range Sm, the flow state of the fluid F is switched to the first state, and the fluid F circulates through the circulation channel 3. The temperature of the fluid F flowing through the circulation channel 3 is adjusted by the first temperature controller 4. The fluid F having temperature adjusted by the first temperature controller 4 is supplied to the temperature control target 100. Furthermore, when the tank temperature $T_p$ is not within the specified temperature range Sm, at least one of the fluid F of the first temperature $T_1$ stored in the low temperature control unit 6 or the fluid F of the second temperature $T_2$ stored in the high temperature control unit 7 will be supplied to the tank 2. With this control, the tank temperature $T_p$ is adjusted to the specified temperature range Sm.

In the following description, the first state is defined as a state in which both the low temperature on-off valve 11L and the high temperature on-off valve 11H are closed, the circulation proportional valve 14 is open, the circulation pump 30 is driven, and both the first on-off valve 15 and the second on-off valve 16 are closed.

In the following description, the second state is defined as a state in which the low temperature on-off valve 11L is open, the high temperature on-off valve 11H is closed, the circulation proportional valve 14 is open, the circulation pump 30 is driven, the first on-off valve 15 is open, and the second on-off valve 16 is closed.

In the following description, the third state is defined as a state in which the high temperature on-off valve 11H is open, the low temperature on-off valve 11L is closed, the circulation proportional valve 14 is open, the circulation pump 30 is driven, the second on-off valve 16 is open, and the first on-off valve 15 is closed.

With the sufficient amount of fluid F contained in the tank 2, the control device 20 opens the circulation proportional valve 14 and drives the circulation pump 30.

With this control, the fluid F circulates through the circulation channel 3.

The control device 20 acquires detection data of the tank temperature sensor 71. The control device 20 determines whether the tank temperature $T_p$ is in the low temperature range Sl (step ST1).

When it is determined in step ST1 that the tank temperature $T_p$ is not in the low temperature range Sl (step ST1: No), the control device 20 determines whether the tank temperature $T_p$ is in the high temperature range Sh (step ST2).

When it is determined in step ST2 that the tank temperature $T_p$ is not in the high temperature range Sh (step ST2: No), the control device 20 determines that the tank temperature $T_p$ is within the specified temperature range Sm.

The control device 20 controls the valve system 10 to switch the flow state of the fluid F to the first state (step ST3).

The control device 20 acquires detection data of the inlet temperature sensor 72 and the detection data of the outlet temperature sensor 73. The control device 20 calculates the difference ΔT between the inlet temperature $T_{in}$ and the outlet temperature $T_{out}$. As described above, in the present embodiment, the outlet temperature $T_{out}$ is higher than the inlet temperature $T_{in}$. The control device 20 determines whether the difference ΔT between the inlet temperature $T_{in}$ and the outlet temperature $T_{out}$ is greater than zero. That is, the control device 20 determines whether the condition [$T_{out}-T_{in}>0$] is satisfied (step ST4).

When it is determined in step ST4 that the condition [$T_{out}-T_{in}>0$] is satisfied (step ST4: Yes), the control device 20 starts adjusting the temperature of the fluid F by the second temperature controller 5. That is, the control device 20 opens the heat exchanger proportional valve 13A (step ST5).

The control device 20 opens the heat exchanger proportional valve 13A in a state where the heat exchanger proportional valve 13B is open and the heat exchanger proportional valve 13C and the heat exchanger proportional valve 13D are closed. When the heat exchanger proportional valve 13A opens, the fluid F of the first temperature $T_1$ is supplied from the low temperature control unit 6 to the second temperature controller 5 via the supply channel 8A. With this configuration, by using heat exchange between the fluid F supplied from the low temperature control unit 6 and the fluid F circulating through the circulation channel 3, the second temperature controller 5 can adjust (cool) the temperature of the fluid F circulating through the circulation channel 3.

FIG. 7 is a diagram illustrating operations of the second temperature controller 5 according to the present embodiment. The control device 20 stores correlation data indicating a relationship of the difference ΔT between the inlet temperature $T_{in}$ and the outlet temperature $T_{out}$ with the opening degree of the heat exchanger proportional valve 13A. The control device 20 adjusts the opening degree of the heat exchanger proportional valve 13A based on the difference ΔT calculated on the basis of the detection data of the inlet temperature sensor 72 and the detection data of the outlet temperature sensor 73, and based on the correlation data. As illustrated in FIG. 7, when the difference ΔT is large, that is, when the outlet temperature $T_{out}$ is high, the opening degree of the heat exchanger proportional valve 13A is adjusted to a large opening degree. Adjusting the opening degree of the heat exchanger proportional valve 13A to a large opening degree will increase the flow rate of the fluid F at the first temperature $T_1$ supplied from the low temperature control unit 6 to the second temperature controller 5. With this adjustment, the second temperature controller 5 can sufficiently cool the fluid F even when the outlet temperature $T_{out}$ is high. In contrast, when the difference ΔT is small, that is, when the outlet temperature $T_{out}$ is low, the opening degree of the heat exchanger proportional valve 13A is adjusted to a small opening degree.

When it is determined in step ST4 that the condition [$T_{out}-T_{in}>0$] is not satisfied (step ST4: No), the control device 20 will not perform adjustment of the temperature of the fluid F by the second temperature controller 5. That is, the control device 20 closes the heat exchanger proportional valve 13A.

The control device 20 controls the first temperature controller 4 so that the temperature of the fluid F to be supplied to the temperature control target 100 becomes the target temperature Sr based on the inlet temperature $T_{in}$ detected by the inlet temperature sensor 72 (step ST6).

That is, the control device 20 performs feedback control on the first temperature controller 4 so that the temperature of the fluid F to be supplied to the temperature control target 100 becomes the target temperature Sr based on the inlet temperature $T_{in}$. The first temperature controller 4 includes the thermoelectric module 60. Accordingly, the first temperature controller 4 can perform high accuracy control of the temperature of the fluid F to be supplied to the temperature control target 100.

When it is determined in step ST2 that the tank temperature $T_p$ is in the high temperature range Sh (step ST2: Yes), the control device 20 controls the valve system 10 to switch the flow state of the fluid F to the second state (step ST7).

By switching the flow state of the fluid F to the second state, the tank temperature $T_p$ in the high temperature range Sh is adjusted to the temperature within the specified temperature range Sm. The control device 20 maintains the second state until the tank temperature $T_p$ reaches the specified temperature range Sm. The control device 20 executes the processes of step ST4, step ST5, and step ST6 while maintaining the second state. The control device 20 switches the flow state of the fluid F from the second state to the first state after the tank temperature $T_p$ reaches the specified temperature range Sm.

When it is determined in step ST1 that the tank temperature $T_p$ is in the low temperature range Sl (step ST1: Yes), the control device 20 controls the valve system 10 to switch the flow state of the fluid F to the third state (step ST8).

By switching the flow state of the fluid F to the third state, the tank temperature $T_p$ in the low temperature range Sl is adjusted to the specified temperature range Sm. The control device 20 maintains the third state until the tank temperature $T_p$ reaches the specified temperature range Sm. The control device 20 executes the processes of step ST4, step ST5, and step ST6 while maintaining the third state. The control device 20 switches the flow state of the fluid F from the third state to the first state after the tank temperature $T_p$ reaches the specified temperature range Sm.

[Effects]

As described above, according to the present embodiment, the temperature control system 1 is equipped with: the circulation channel 3 including the temperature control target 100 and the tank 2 that contains the fluid F adjusted to the specified temperature range Sm including the target temperature Sr of the temperature control target 100; and the first temperature controller 4 that is arranged between the tank 2 and the temperature control target 100 in the circulation channel 3 and that adjusts the temperature of the fluid F to be supplied to the temperature control target 100. Since the tank 2 contains the fluid F adjusted to the specified temperature range Sm, the first temperature controller 4 can perform high accuracy adjustment of the temperature of the fluid F to be supplied to the temperature control target 100 to the target temperature Sr. Furthermore, according to the present embodiment, the first temperature controller 4 includes the thermoelectric module 60. Therefore, as compared with the method of adjusting the temperature of the fluid F by controlling the valve opening degree of a variable valve, for example, there is no need to use the variable valve, making it possible to control the temperature of the fluid F with high accuracy.

The valve system 10 sets the flow state of the fluid F to the first state when the tank temperature $T_p$ is within the specified temperature range Sm. With this setting, in the first state, the fluid F adjusted to the specified temperature range Sm circulates through the circulation channel 3. The first temperature controller 4 can perform high accuracy adjustment of the temperature of the fluid F adjusted to the specified temperature range Sm. Furthermore, the valve system 10 sets the flow state of the fluid F to the second state or the third state when the tank temperature $T_p$ is not within the specified temperature range Sm, that is, when it is in the high temperature range Sh or the low temperature range Sl. With this control, the temperature of the fluid F is adjusted to the specified temperature range Sm.

The control device 20 controls the heat exchanger proportional valve 13A based on the difference $\Delta T$ between the inlet temperature $T_{in}$ and the outlet temperature $T_{out}$ so as to adjust the flow rate of the fluid F to be supplied from the low temperature control unit 6 to the second temperature controller 5. With this control, even when the temperature of the fluid F flowing out of the temperature control target 100 is high, the second temperature controller 5 can sufficiently cool the fluid F flowing out of the temperature control target 100.

Other Embodiments

In the above-described embodiment, there are provided the low temperature control unit 6 capable of delivering the fluid F of the first temperature $T_1$ and the high temperature control unit 7 capable of delivering the fluid F of the second temperature $T_2$ higher than the first temperature $T_1$.

When adjusting the temperature of the fluid F using the second temperature controller 5 arranged in the circulation channel 3, at least one of the fluid F of the first temperature $T_1$ or the fluid F of the second temperature $T_2$ is to be supplied to the second temperature controller 5 so as to adjust the temperature of the fluid F supplied from the second temperature controller 5 to the tank 2. Furthermore, the outlet temperature $T_{out}$, which indicates the temperature of the fluid F flowing out of the temperature control target 100 and before being supplied to the second temperature controller 5, is set to be higher than the inlet temperature $T_{in}$, which indicates the temperature of the fluid flowing into the temperature control target 100 after undergoing temperature adjustment performed by the first temperature controller 4. In addition, when the difference $\Delta T$ between the outlet temperature $T_{out}$ and the inlet temperature $T_{in}$ is greater than zero, that is, when the condition $[T_{out}-T_{in}>0]$ is satisfied, the heat exchanger proportional valve 13A opens to supply the fluid F of the first temperature $T_1$ from the low temperature control unit 6 to the second temperature controller 5. When the outlet temperature $T_{out}$ is lower than the inlet temperature $T_{in}$ and the difference $\Delta T$ between the outlet temperature $T_{out}$ and the inlet temperature $T_{in}$ is greater than zero, that is, when the condition $[T_{out}-T_{in}<0]$ is satisfied, the fluid F of the second temperature $T_2$ may be supplied from the high temperature control unit 7 to the second temperature controller 5. When the fluid F of the second temperature $T_2$ is supplied from the high temperature control unit 7 to the second temperature controller 5, the control device 20 opens the heat exchanger proportional valve 13C and the heat exchanger proportional valve 13D in a state where the heat exchanger proportional valve 13A and the heat exchanger proportional valve 13B are closed. With this control, the fluid F of the second temperature $T_2$ delivered from the high temperature control unit 7 will be supplied to the second temperature controller 5 via the connection channel 8C and the supply channel 8A. The fluid F used for heat exchange in the second temperature controller 5 will be returned to the high temperature control unit 7 via the recovery channel 8B and the connection channel 8D.

Second Embodiment

A second embodiment will be described. In the following description, the same or equivalent components as those in the above-described embodiment are designated by the same reference numerals, and the description thereof will be simplified or omitted.

[Temperature Control System]

Figure 8:
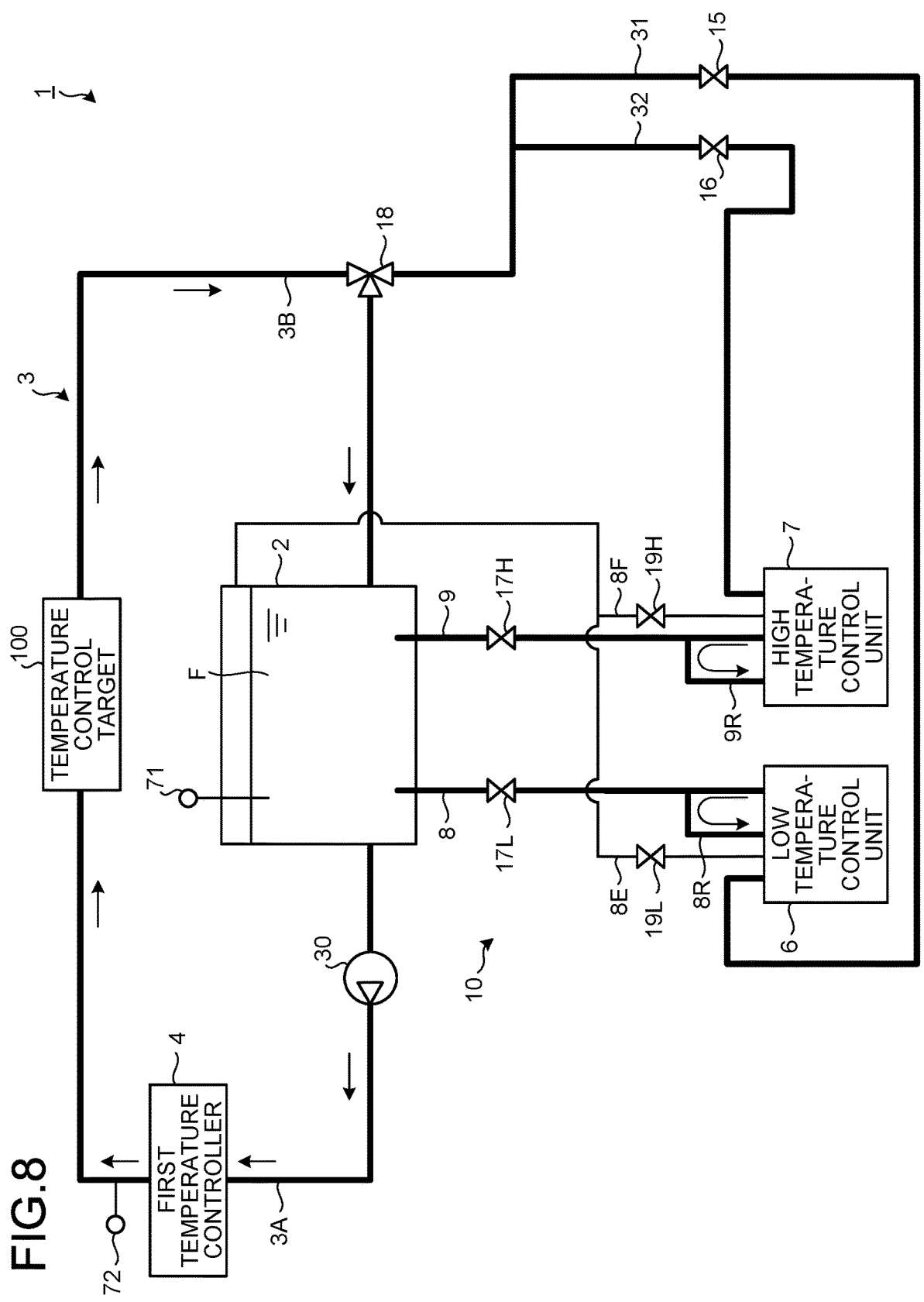
FIG. 8 is a configuration diagram illustrating a temperature control system according to a second embodiment.
Figure 9:
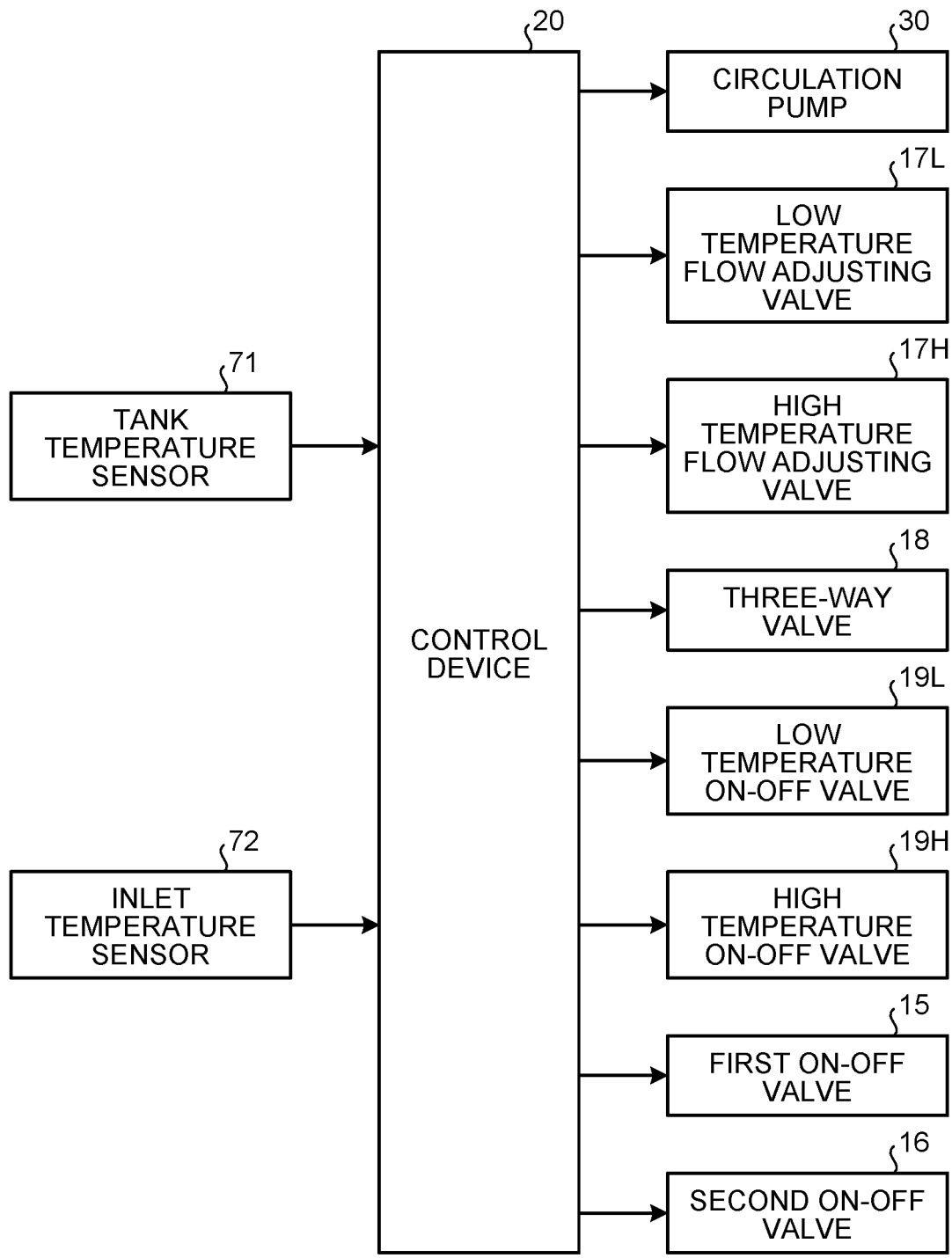
FIG. 9 is a block diagram illustrating the temperature control system according to the second embodiment.

FIG. 8 is a configuration diagram illustrating a temperature control system 1 according to the present embodiment. FIG. 9 is a block diagram illustrating the temperature control system 1 according to the present embodiment. As illustrated in FIGS. 8 and 9, the temperature control system 1 is equipped with: a circulation channel 3 including a temperature control target 100 and a tank 2; and a first temperature controller 4 that adjusts the temperature of a fluid F to be supplied to the temperature control target 100.

Furthermore, the temperature control system 1 includes a low temperature control unit 6 that stores the fluid F of a first temperature $T_1$, a high temperature control unit 7 that stores the fluid F of a second temperature $T_2$ that is higher than the first temperature $T_1$, a low temperature channel 8 through which the fluid F supplied from the low temperature control unit 6 to the tank 2 flows, a high temperature channel 9 through which the fluid F supplied from the high temperature control unit 7 to the tank 2 flows, a first overflow channel 8E through which the fluid F returned from the tank 2 to the low temperature control unit 6 flows, a second overflow channel 8F through which the fluid F returned from the tank 2 to the high temperature control unit 7 flows, a valve system 10 capable of switching the flow state of the fluid F so that the fluid F contained in the tank 2 becomes a target temperature Sr, and a control device 20 that controls the temperature control system 1.

A second portion 3B of the circulation channel 3 and the low temperature control unit 6 are connected via a first bypass channel 31. The second portion 3B of the circulation channel 3 and the high temperature control unit 7 are connected via a second bypass channel 32. The first bypass channel 31 includes a first on-off valve 15. The second bypass channel 32 includes a second on-off valve 16.

There is provided a three-way valve 18 at a boundary between the circulation channel 3, the first bypass channel 31, and the second bypass channel 32. The three-way valve 18 is controlled by the control device 20. The control device 20 controls the three-way valve 18 to switch between supplying and stopping the fluid F from the temperature control target 100 to the tank 2. When the fluid F is supplied from the temperature control target 100 to the tank 2 by the three-way valve 18, the supply of the fluid F from the circulation channel 3 to the low temperature control unit 6 and the high temperature control unit 7 is stopped. When the supply of the fluid F from the temperature control target 100 to the tank 2 is stopped by the three-way valve 18, the fluid F in the circulation channel 3 can be supplied to the low temperature control unit 6 and the high temperature control unit 7.

The low temperature control unit 6 can deliver the fluid F of the first temperature $T_1$ to the tank 2. An example of the first temperature $T_1$ is −10° C. The high temperature control unit 7 can deliver the fluid F of the second temperature $T_2$ to the tank 2. An example of the second temperature $T_2$ is 90° C.

The low temperature channel 8 connects the low temperature control unit 6 and the tank 2 with each other.

The fluid F of the first temperature $T_1$ supplied from the low temperature control unit 6 to the tank 2 flows through the low temperature channel 8.

The high temperature channel 9 connects the high temperature control unit 7 and the tank 2 with each other.

The fluid F of the second temperature $T_2$ supplied from the high temperature control unit 7 to the tank 2 flows through the high temperature channel 9.

The first overflow channel 8E connects the upper part of the tank 2 and the low temperature control unit 6 with each other. When the fluid F is supplied from the low temperature control unit 6 to the tank 2 and the fluid F contained in the tank 2 reaches a specified amount, at least a part of the fluid F contained in the tank 2 will be returned to the low temperature control unit 6 via the first overflow channel 8E. The fluid F returned from the tank 2 to the low temperature control unit 6 flows through the first overflow channel 8E. The first overflow channel 8E makes it possible to suppress the overflow of the fluid F contained in the tank 2 from the tank 2 even when the fluid F is supplied from the low temperature control unit 6 to the tank 2.

The second overflow channel 8F connects the upper part of the tank 2 and the high temperature control unit 7 with each other. When the fluid F is supplied from the high temperature control unit 7 to the tank 2 and the fluid F contained in the tank 2 reaches a specified amount, at least a part of the fluid F contained in the tank 2 will be returned to the high temperature control unit 7 via the second overflow channel 8F. The fluid F returned from the tank 2 to the high temperature control unit 7 flows through the second overflow channel 8F. The second overflow channel 8F makes it possible to suppress the overflow of the fluid F contained in the tank 2 from the tank 2 even when the fluid F is supplied from the high temperature control unit 7 to the tank 2.

The valve system 10 is capable of switching the flow state of the fluid F from the low temperature control unit 6 and the high temperature control unit 7 to the tank 2. Furthermore, the valve system 10 is capable of switching the flow state of the fluid F from the tank 2 to the low temperature control unit 6 and the high temperature control unit 7. The valve system 10 is controlled by the control device 20.

The valve system 10 is capable of switching the flow state between a first state in which the fluid F is not supplied to the tank 2 either from the low temperature control unit 6 or the high temperature control unit 7, a second state in which the fluid F is supplied from the low temperature control unit 6 to the tank 2, and a third state in which the fluid F is supplied from the high temperature control unit 7 to the tank 2. The first state is a state in which the fluid F is not supplied to the tank 2 from either the low temperature control unit 6 or the high temperature control unit 7. The second state is a state in which the fluid F of the first temperature $T_1$ is supplied from the low temperature control unit 6 to the tank 2 while the fluid F is not supplied from the high temperature control unit 7 to the tank 2. The third state is a state in which the fluid F of the second temperature $T_2$ is supplied from the high temperature control unit 7 to the tank 2 while the fluid F is not supplied from the low temperature control unit 6 to the tank 2.

The valve system 10 is capable of switching the flow state between a fourth state in which the fluid F is not returned from the tank 2 to the low temperature control unit 6 or the high temperature control unit 7, a fifth state in which the fluid F is returned from the tank 2 to the low temperature control unit 6, and a sixth state in which the fluid F is returned from the tank 2 to the high temperature control unit 7. The fourth state is a state in which the fluid F is not returned from the tank 2 to either the low temperature control unit 6 or the high temperature control unit 7. The fifth state is a state in which the fluid F is returned from the tank 2 to the low temperature control unit 6 while the fluid F is not returned from the tank 2 to the high temperature control unit 7. The sixth state is a state in which the fluid F is returned from the tank 2 to the high temperature control unit 7 while the fluid F is not returned from the tank 2 to the low temperature control unit 6.

The valve system 10 switches the flow state to the fourth state when in the first state, to the fifth state when in the second state, and to the sixth state when in the third state. That is, when the fluid F is not supplied from either of the low temperature control unit 6 or the high temperature control unit 7 to the tank 2, the fluid F is not to be returned from the tank 2 to either the low temperature control unit 6 or the high temperature control unit 7. When the fluid F is supplied from the low temperature control unit 6 to the tank 2, and the fluid F contained in the tank 2 reaches a specified amount, the fluid F is returned from the tank 2 to the low temperature control unit 6. When the fluid F is supplied from the high temperature control unit 7 to the tank 2, and the fluid F contained in the tank 2 reaches a specified amount, the fluid F is returned from the tank 2 to the high temperature control unit 7.

The valve system 10 includes a low temperature flow adjusting valve 17L arranged in the low temperature channel 8, a high temperature flow adjusting valve 17H arranged in the high temperature channel 9, a low temperature on-off valve 19L arranged in the first overflow channel 8E, and a high temperature on-off valve 19H arranged in the second overflow channel 8F.

The low temperature flow adjusting valve 17L is controlled by the control device 20. The control device 20 can control the low temperature flow adjusting valve 17L to switch between supplying and stopping the fluid F from the low temperature control unit 6 to the tank 2 and to adjust the flow rate of the fluid F supplied from the low temperature control unit 6 to the tank 2. When the low temperature flow adjusting valve 17L opens, the fluid F of the first temperature $T_1$ is supplied from the low temperature control unit 6 to the tank 2. When the low temperature flow adjusting valve 17L is closed, the supply of the fluid F from the low temperature control unit 6 to the tank 2 is stopped.

The high temperature flow adjusting valve 17H is controlled by the control device 20. The control device 20 can control the high temperature flow adjusting valve 17H to switch between supplying and stopping the fluid F from the high temperature control unit 7 to the tank 2 and to adjust the flow rate of the fluid F supplied from the high temperature control unit 7 to the tank 2. When the high temperature flow adjusting valve 17H opens, the fluid F of the second temperature $T_2$ is supplied from the high temperature control unit 7 to the tank 2. When the high temperature flow adjusting valve 17H is closed, the supply of the fluid F from the high temperature control unit 7 to the tank 2 is stopped.

The low temperature flow adjusting valve 17L may be a proportional valve or an on-off valve. The proportional valve can control the flow rate of the fluid F with high accuracy. Therefore, when the proportional valve is used as the low temperature flow adjusting valve 17L, the temperature control of the fluid F in the tank 2 can be performed with high accuracy. When high accuracy flow rate control of the fluid F and high accuracy temperature control of the fluid F in the tank 2 are not required, an inexpensive on-off valve may be used as the low temperature flow adjusting valve 17L. Similarly, the high temperature flow adjusting valve 17H may be a proportional valve or an on-off valve.

The low temperature on-off valve 19L is an on-off valve. When the low temperature on-off valve 19L opens, the fluid F is returned from the tank 2 to the low temperature control unit 6. When the low temperature on-off valve 19L is closed, the fluid F is not to be returned from the tank 2 to the low temperature control unit 6. An example of the on-off valve is a solenoid valve.

The high temperature on-off valve 19H is an on-off valve. When the high temperature on-off valve 19H opens, the fluid F is returned from the tank 2 to the high temperature control unit 7. When the high temperature on-off valve 19H is closed, the fluid F is not to be returned from the tank 2 to the high temperature control unit 7. An example of the on-off valve is a solenoid valve.

When setting the flow state of the fluid F to the first state, the control device 20 closes the low temperature flow adjusting valve 17L and the high temperature flow adjusting valve 17H individually. With this configuration, the fluid F will not be supplied to the tank 2 either from the low temperature control unit 6 or the high temperature control unit 7.

When setting the flow state of the fluid F to the second state, the control device 20 opens the low temperature flow adjusting valve 17L and closes the high temperature flow adjusting valve 17H. With this setting, the fluid F of the first temperature $T_1$ delivered from the low temperature control unit 6 is supplied to the tank 2 at a specified flow rate via the low temperature channel 8.

When setting the flow state of the fluid F to the third state, the control device 20 opens the high temperature flow adjusting valve 17H and closes the low temperature flow adjusting valve 17L. With this setting, the fluid F of the second temperature $1_2$ delivered from the high temperature control unit 7 is supplied to the tank 2 at a specified flow rate via the high temperature channel 9.

When setting the flow state of the fluid F to the fourth state, the control device 20 closes the low temperature on-off valve 19L and the high temperature on-off valve 19H individually to set the opening degree of the three-way valve 18 connecting the second portion 3B and the first portion 3A to 100% so as to allow the fluid F to flow from the second portion 3B to the first portion 3A. In addition, the control device 20 sets the opening degree of the three-way valve 18 connecting the second portion 3B individually with the first bypass channel 31 and the second bypass channel 32 to 0% so as not to allow the fluid F to flow from the second portion 3B individually to the first bypass channel 31 or the second bypass channel 32, and closes the first on-off valve 15 and the second on-off valve 16 individually. With this control, the fluid F is not to be returned from the tank 2 to either the low temperature control unit 6 or the high temperature control unit 7.

When setting the flow state of the fluid F to the fifth state, the control device 20 opens the low temperature on-off valve 19L and closes the high temperature on-off valve 19H. In addition, based on the difference between the temperature of the fluid F within the tank 2 and the target temperature Sr, the control device 20 controls the opening degree of the three-way valve 18 connecting the circulation channel 3 individually with the first bypass channel 31 and the second bypass channel 32 so as to allow a part of the fluid F to flow from the second portion 3B to the circulation channel 3 and allow the remaining fluid F to flow individually to the first bypass channel 31 and the second bypass channel 32. Moreover, the control device 20 opens the first on-off valve 15 and closes the second on-off valve 16.

With this control, at least a part of the fluid F contained in the tank 2 is to be returned to the low temperature control unit 6 via the first overflow channel 8E, and at least a part of the fluid F flowing through the circulation channel 3 is to be returned to the low temperature control unit 6 via the first bypass channel 31.

When setting the flow state of the fluid F to the sixth state, the control device 20 opens the high temperature on-off valve 19H and closes the low temperature on-off valve 19L. In addition, based on the difference between the temperature of the fluid F within the tank 2 and the target temperature Sr, the control device 20 controls the opening degree of the three-way valve 18 connecting the circulation channel 3 individually with the first bypass channel 31 and the second bypass channel 32 so as to allow a part of the fluid F to flow from the second portion 3B to the circulation channel 3 and allow the remaining fluid F to flow individually to the first bypass channel 31 and the second bypass channel 32. Moreover, the control device 20 closes the first on-off valve 15 and opens the second on-off valve 16. With this control, at least a part of the fluid F contained in the tank 2 is to be returned to the high temperature control unit 7 via the second overflow channel 8F, and at least a part of the fluid F flowing through the circulation channel 3 is to be returned to the high temperature control unit 7 via the second bypass channel 32.

The control device 20 can control the three-way valve 18 and the first on-off valve 15 to switch between supplying and stopping the fluid F from the circulation channel 3 to the low temperature control unit 6.

Furthermore, the control device 20 can control the three-way valve 18 and the second on-off valve 16 to switch between supplying and stopping the fluid F from the circulation channel 3 to the high temperature control unit 7. For example, when the amount of the fluid F contained in the tank 2 increases and the fluid F is about to overflow from the tank 2, the control device 20 can control the three-way valve 18 and the first on-off valve 15 so as to allow at least a part of the fluid F flowing through the circulation channel 3 to be supplied to the low temperature control unit 6 via the first bypass channel 31. When the fluid F is about to overflow from the tank 2, the control device 20 may control the three-way valve 18 and the second on-off valve 16 so as to allow at least a part of the fluid F flowing through the circulation channel 3 to be supplied to the high temperature control unit 7 via the second bypass channel 32. This makes it possible to suppress the overflow of the fluid F from the tank 2. Furthermore, for example, when the amount of the fluid F stored in the low temperature tank of the low temperature control unit 6 has decreased, the control device 20 can control the three-way valve 18 and the first on-off valve 15 to supply the fluid F from the circulation channel 3 to the low temperature tank of the low temperature control unit 6 via the first bypass channel 31. Similarly, when the amount of the fluid F stored in the high temperature tank of the high temperature control unit 7 has decreased, the control device 20 can control the three-way valve 18 and the second on-off valve 16 to supply the fluid F from the circulation channel 3 to the high temperature tank of the high temperature control unit 7 via the second bypass channel 32.

The first temperature controller 4 adjusts the temperature of the fluid F based on the inlet temperature $T_{in}$. Based on detection data of the inlet temperature sensor 72, the control device 20 controls the drive circuit 45 of the first temperature controller 4 so that the inlet temperature $T_{in}$ of the fluid F to be supplied to the temperature control target 100 becomes the target temperature Sr.

The control device 20 can control the low temperature flow adjusting valve 17L, the three-way valve 18, and the first on-off valve 15 individually to perform high accuracy control of the temperature of the fluid F to be supplied from the circulation channel 3 to the temperature control target 100. For example, the temperature of the fluid F supplied from the circulation channel 3 to the temperature control target 100 rises by cooling the temperature control target 100.

By controlling the opening degree of the three-way valve 18 and the opening degree of the low temperature flow adjusting valve 17L and controlling the first on-off valve 15 to be set to the open state, the fluid F that has passed the temperature control target 100 to have a higher temperature is divided into two routes, that is, a route to flow through the first bypass channel 31 by the three-way valve 18 to return to the low temperature control unit 6 via the first on-off valve 15, and a route to return to the tank 2.

Furthermore, the fluid F of the amount that supplements the fluid F that has passed through the first bypass channel 31 and returned to the low temperature control unit 6 via the first on-off valve 15 is to flow from the low temperature control unit 6 through the low temperature channel 8 via the low temperature flow adjusting valve 17L and is supplied to the tank 2, making it possible to perform quick and high accuracy control of the temperature of the fluid F in the tank 2. The fluid F in the tank 2 flows through the first portion 3A via the circulation pump 30, undergoes temperature control by the first temperature controller 4 with higher accuracy, and is supplied to the temperature control target 100.

[Operations of Valve System]

Figure 10:
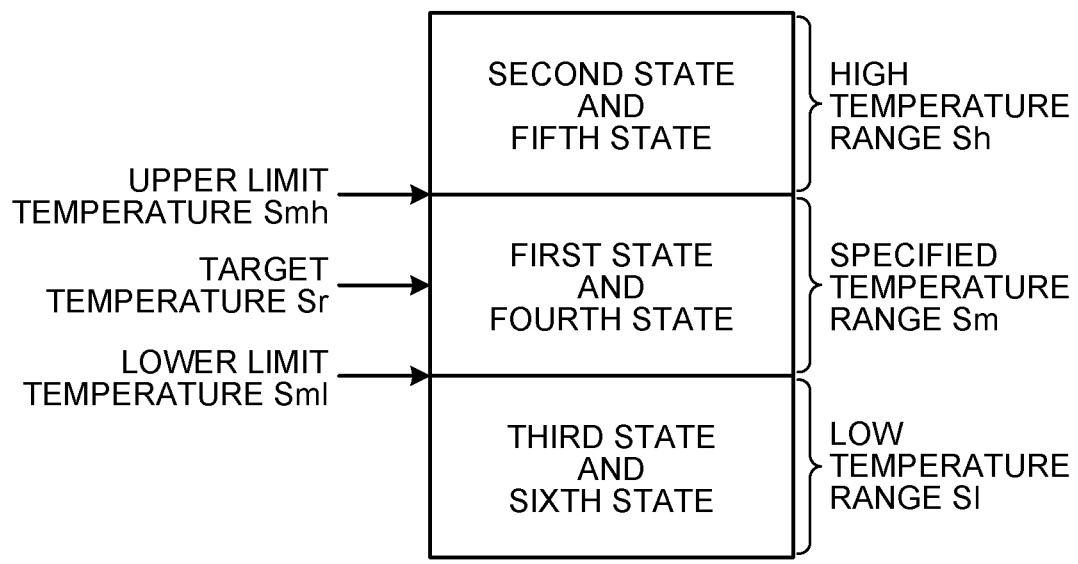
FIG. 10 is a diagram illustrating operations of a valve system according to the second embodiment.

FIG. 10 is a diagram illustrating operations of the valve system 10 according to the present embodiment. The valve system 10 switches the flow state of the fluid F to the fourth state when in the first state, switches to the fifth state when in the second state, and switches to the sixth state when in the third state. That is, when the fluid F stored in the low temperature control unit 6 and the fluid F stored in the high temperature control unit 7 are not to be supplied to the tank 2, the fluid F contained in the tank 2 will not be returned to the low temperature control unit 6 or to the high temperature control unit 7. When the fluid F of the first temperature $T_1$ stored in the low temperature control unit 6 is to be supplied to the tank 2, at least a part of the fluid F contained in the tank 2 will be returned to the low temperature control unit 6. When the fluid F of the second temperature $T_2$ higher than the first temperature $T_1$, stored in the high temperature control unit 7, is to be supplied to the tank 2, at least a part of the fluid F contained in the tank 2 will be returned to the high temperature control unit 7.

The valve system 10 switches the flow state between the first state, the second state, and the third state based on the tank temperature $T_p$. Based on the detection data of the tank temperature sensor 71, the control device 20 controls the low temperature flow adjusting valve 17L, the high temperature flow adjusting valve 17H, the low temperature on-off valve 19L, and the high temperature on-off valve 19H.

In the present embodiment, the valve system 10 switches the flow state of the fluid F to the first state and the fourth state when the tank temperature $T_p$ is within the specified temperature range Sm.

As illustrated in FIG. 10, the specified temperature range Sm includes the target temperature Sr of the temperature control target 100. The specified temperature range Sm is a temperature range between an upper limit temperature Smh and a lower limit temperature Sml lower than the upper limit temperature Smh.

That is, when the tank temperature $T_p$ is within the specified temperature range Sm, both the low temperature flow adjusting valve 17L and the high temperature flow adjusting valve 17H will be closed, and supply of the fluid F individually from the low temperature control unit 6 and the high temperature control unit 7 to the tank 2 will be stopped. That is, when the tank temperature $T_p$ is within the specified temperature range Sm, both the low temperature on-off valve 19L and the high temperature on-off valve 19H will closed, and supply of the fluid F individually from the low temperature control unit 6 and the high temperature control unit 7 to the tank 2 will be stopped. When the tank temperature $T_p$ is within the specified temperature range Sm, the fluid F circulates through the circulation channel 3. That is, in the first state and the fourth state, the fluid F circulates through the circulation channel 3. The temperature of the fluid F circulating through the circulation channel 3 is adjusted by the first temperature controller 4.

The valve system 10 switches the flow state of the fluid F to the second state and the fifth state when the tank temperature $T_p$ is in the high temperature range Sh higher than the upper limit temperature Smh of the specified temperature range Sm.

That is, when the tank temperature $T_p$ is in the high temperature range Sh, the low temperature flow adjusting valve 17L opens, the high temperature flow adjusting valve 17H is closed, and the fluid F of the first temperature $T_1$ is supplied from the low temperature control unit 6 to the tank 2. When the tank temperature $T_p$ is in the high temperature range Sh, the fluid F of the first temperature $T_1$ is supplied to the tank 2 so as to adjust the tank temperature $T_p$ to the specified temperature range Sm. The control device 20 controls the low temperature flow adjusting valve 17L so as to increase the flow rate of the fluid F supplied from the low temperature control unit 6 to the tank 2 per unit time, making it possible to adjust the tank temperature $T_p$ in the high temperature range Sh to the specified temperature range Sm in a short time. In addition, in a state where the fluid F of the first temperature $T_1$ is supplied from the low temperature control unit 6 to the tank 2, the low temperature on-off valve 19L opens, the high temperature on-off valve 19H is closed, and the fluid F is returned from the tank 2 to the low temperature control unit 6. This makes it possible to suppress overflow of the fluid F from the tank 2 even when a large amount of fluid F is supplied from the low temperature control unit 6 to the tank 2. Furthermore, by returning the fluid F from the tank 2 to the low temperature control unit 6, it is possible to suppress the decrease of the amount of the fluid F stored in the low temperature tank of the low temperature control unit 6.

The valve system 10 switches the flow state of the fluid F to the third state and the sixth state when the tank temperature $T_p$ is in the low temperature range S1 lower than the lower limit temperature Sml of the specified temperature range Sm.

That is, when the tank temperature $T_p$ is in the low temperature range S1, the high temperature flow adjusting valve 17H opens, the low temperature flow adjusting valve 17L is closed, and the fluid F of the second temperature $T_2$ is supplied from the high temperature control unit 7 to the tank 2. When the tank temperature $T_p$ is in the low temperature range S1, the fluid F of the second temperature $T_2$ is supplied to the tank 2 so as to adjust the tank temperature $T_p$ to the specified temperature range Sm. The control device 20 controls the high temperature flow adjusting valve 17H so as to increase the flow rate of the fluid F supplied from the high temperature control unit 7 to the tank 2 per unit time, making it possible to adjust the tank temperature $T_p$ in the low temperature range S1 to the specified temperature range Sm in a short time. Furthermore, in a state where the fluid F of the second temperature $T_2$ is supplied from the high temperature control unit 7 to the tank 2, the high temperature on-off valve 19H opens, the low temperature on-off valve 19L is closed, and the fluid F is returned from the tank 2 to the high temperature control unit 7. This makes it possible to suppress overflow of the fluid F from the tank 2 even when a large amount of fluid F is supplied from the high temperature control unit 7 to the tank 2. Furthermore, by returning the fluid F from the tank 2 to the high temperature control unit 7, it is possible to suppress the decrease of the amount of the fluid F stored in the high temperature tank of the high temperature control unit 7.

[Effects]

As described above, according to the present embodiment, the first overflow channel 8E and the second overflow channel 8F are provided. When the tank temperature $T_p$ is in the high temperature range Sh, the flow state of the fluid F is switched to the second state and the fifth state. By switching the flow state to the second state, the tank temperature $T_p$ in the high temperature range Sh is adjusted to the specified temperature range Sm. Furthermore, by supplying a large amount of the fluid F of the first temperature $T_1$ from the low temperature control unit 6 to the tank 2, the tank temperature $T_p$ of the high temperature range Sh is adjusted to the specified temperature range Sm in a short time. Since the flow state of the fluid F is switched to the fifth state, the overflow of the fluid F from the tank 2 would be suppressed even when a large amount of fluid F is supplied from the low temperature control unit 6 to the tank 2. Furthermore, it is possible to suppress the decrease of the amount of the fluid F stored in the low temperature tank of the low temperature control unit 6. Furthermore, when the tank temperature $T_p$ is in the low temperature range Sl, the flow state of the fluid F is switched to the third state and the sixth state. By switching the flow state to the third state, the tank temperature $T_p$ in the low temperature range S1 is adjusted to the specified temperature range Sm. Furthermore, by supplying a large amount of the fluid F of the second temperature $T_2$ from the high temperature control unit 7 to the tank 2, the tank temperature $T_p$ of the low temperature range Sl is adjusted to the specified temperature range Sm in a short time. Since the flow state of the fluid F is switched to the sixth state, the overflow of the fluid F from the tank 2 would be suppressed even when a large amount of fluid F is supplied from the high temperature control unit 7 to the tank 2. Furthermore, it is possible to suppress the decrease of the amount of the fluid F stored in the high temperature tank of the high temperature control unit 7.

Third Embodiment

A third embodiment will be described. In the following description, the same or equivalent components as those in the above-described embodiment are designated by the same reference numerals, and the description thereof will be simplified or omitted. The configuration of a temperature control system 1 according to the present embodiment is the same as that of the temperature control system 1 according to the second embodiment described with reference to FIG. 8

[Operations of Valve System]

Figure 11:
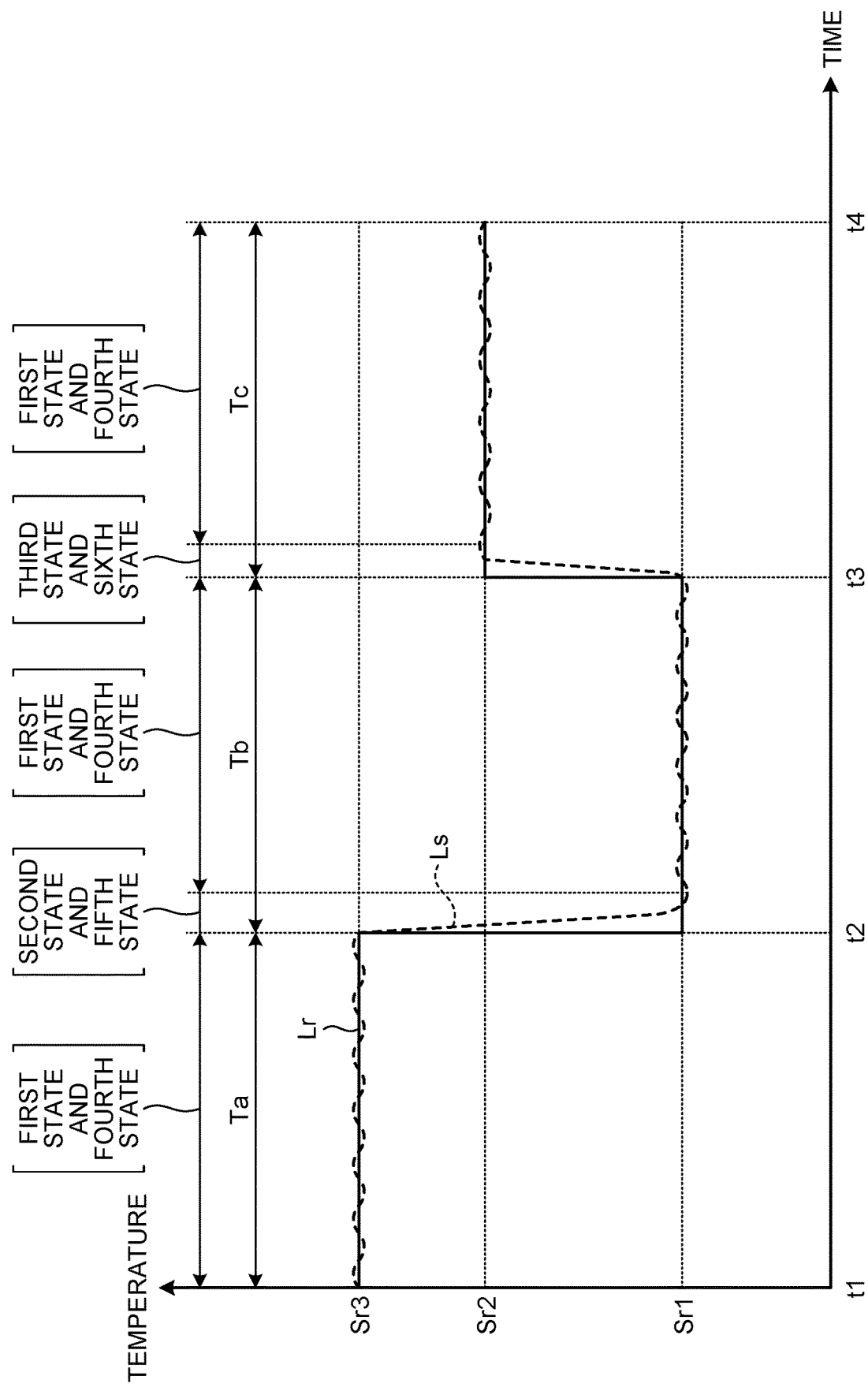
FIG. 11 is a diagram illustrating operations of a valve system according to a third embodiment.

FIG. 11 is a diagram illustrating operations of a valve system 10 according to the present embodiment. Similar to the second embodiment described above, the valve system 10 switches the flow state of the fluid F to the fourth state when in the first state, to the fifth state when in the second state, and to the sixth state when in the third state.

In the present embodiment, the target temperature Sr to be set includes: a first target temperature Sr1, a second target temperature Sr2 higher than the first target temperature Sr1, and a third target temperature Sr3 higher than the second target temperature Sr2. When the temperature control target 100 is a wafer holder of a plasma processing device, the target temperature Sr of the wafer holder might be changed in a state where the wafer is held by the wafer holder. That is, depending on the details of the plasma processing, the target temperature Sr of the wafer holder might be set to the first target temperature Sr1, the second target temperature Sr2, or the third target temperature Sr3.

As an example, the first target temperature Sr1 is 25° C., the second target temperature Sr2 is 60° C., and the third target temperature Sr3 is 80° C. Note that the target temperature Sr may be set to two types, namely, the first target temperature Sr1 and the second target temperature Sr2, or may be set to four or more types of temperatures.

The first temperature $T_1$ of the fluid F stored in the low temperature control unit 6 is lower than the lowest target temperature Sr among the plurality of types of target temperature Sr. The second temperature $T_2$ of the fluid F stored in the high temperature control unit 7 is higher than the highest target temperature Sr among the plurality of target temperature Sr. In the present embodiment, the first temperature $T_1$ is lower than the first target temperature Sr1. The second temperature $T_2$ is higher than the third target temperature Sr3. That is, the condition $[T_1<Sr1<Sr2<Sr3<T_2]$ is satisfied.

In FIG. 11, a solid line Lr indicates the target temperature Sr while a dotted line Ls indicates the tank temperature $T_p$ of the fluid F detected by the tank temperature sensor 71. In the example illustrated in FIG. 11, the target temperature Sr is set to the third target temperature Sr3 in a first period Ta from a first time point t1 after the wafer is held in the wafer holder to a second time point t2 after the lapse of the first time. In a second period Tb from the second time point t2 to a third time point t3 after the lapse of the second time, the target temperature Sr is set to the first target temperature Sr1. In a third period Tc from the third time point t3 to a fourth time point t4 after the lapse of the third time, the target temperature Sr is set to the second target temperature Sr2.

At the second time point t2, the tank temperature $T_p$ preferably changes instantaneously from the third target temperature Sr3 to the first target temperature Sr1. At the third time point t3, the tank temperature $T_p$ preferably changes instantaneously from the first target temperature Sr1 to the second target temperature Sr2.

In the first period Ta, the difference between the tank temperature $T_p$ of the fluid F and the third target temperature Sr3 is maintained to an acceptable value or less. When the difference of the tank temperature $T_p$ and the third target temperature Sr3 is the acceptable value or less, it means that the tank temperature $T_p$ is within the specified temperature range Sm. The valve system 10 maintains the flow state of the fluid F in the first state and the fourth state in the first period Ta.

When the target temperature Sr has been switched from the third target temperature Sr3 to the first target temperature Sr1 at the second time point t2, the valve system 10 switches the flow state of the fluid F from the first state and the fourth state to the second state and the fifth state. That is, when the target temperature Sr has been switched from the third target temperature Sr3 to the first target temperature Sr1, the control device 20 controls the valve system 10 so that the fluid F of the first temperature $T_1$ will be supplied from the low temperature control unit 6 to the tank 2 and that at least a part of the fluid F contained in the tank 2 will be returned to the low temperature control unit 6.

After the flow state of the fluid F has been switched from the first state and the fourth state to the second state and the fifth state, and the difference between the tank temperature $T_p$ of the fluid F and the first target temperature Sr1 becomes an acceptable value or less, the valve system 10 returns the flow state of the fluid F to the first state and the fourth state. After the difference between the tank temperature $T_p$ of the fluid F and the first target temperature Sr1 becomes an acceptable value or less, the difference between the tank temperature $T_p$ of the fluid F and the first target temperature Sr1 is maintained at the acceptable value or less. Immediately after the target temperature Sr is switched from the third target temperature Sr3 to the first target temperature Sr1, the tank temperature $T_p$ is to be in the high temperature range Sh. When the difference between the tank temperature $T_p$ and the first target temperature Sr1 is the acceptable value or less, it means that the tank temperature $T_p$ exists within the specified temperature range Sm. After the difference between the tank temperature $T_p$ of the fluid F and the first target temperature Sr1 becomes an acceptable value or less in the second period Tb, the valve system 10 maintains the flow state of the fluid F in the first state and the fourth state.

When the target temperature Sr has been switched from the first target temperature Sr1 to the second target temperature Sr2 at the third time point t3, the valve system 10 switches the flow state of the fluid F from the first state and the fourth state to the third state and the sixth state. That is, when the target temperature Sr has been switched from the first target temperature Sr1 to the second target temperature Sr2, the control device 20 controls the valve system 10 so that the fluid F of the second temperature $T_2$ will be supplied from the high temperature control unit 7 to the tank 2 and that at least a part of the fluid F contained in the tank 2 will be returned to the high temperature control unit 7.

After the flow state of the fluid F has been switched from the first state and the fourth state to the third state and the sixth state and the difference between the tank temperature $T_p$ of the fluid F and the second target temperature Sr2 becomes an acceptable value or less, the valve system 10 returns the flow state of the fluid F to the first state and the fourth state. After the difference between the tank temperature $T_p$ and the second target temperature Sr2 of the fluid F becomes an acceptable value or less, the difference between the tank temperature $T_p$ of the fluid F and the second target temperature Sr2 is maintained at the acceptable value or less. Immediately after the target temperature Sr is switched from the first target temperature Sr1 to the second target temperature Sr2, the tank temperature $T_p$ is to be in the low temperature range Sl.

When the difference between the tank temperature $T_p$ and the second target temperature Sr2 is the acceptable value or less, it means that the tank temperature $T_p$ exists within the specified temperature range Sm. After the difference between the tank temperature $T_p$ of the fluid F and the second target temperature Sr2 becomes an acceptable value or less in the third period Tc, the valve system 10 maintains the flow state of the fluid F in the first state and the fourth state.

[Effects]

As described above, according to the present embodiment, when the target temperature Sr is changed from a high value to a low value, the valve system 10 switches the flow state of the fluid F to the second state and the fifth state. With this control, the tank temperature $T_p$ is adjusted to the target temperature Sr. By supplying a large amount of fluid F of the first temperature $T_1$ from the low temperature control unit 6 to the tank 2, the tank temperature $T_p$ is adjusted to the target temperature Sr in a short time. Since the flow state of the fluid F is switched to the fifth state, the overflow of the fluid F from the tank 2 would be suppressed even when a large amount of fluid F is supplied from the low temperature control unit 6 to the tank 2 in the second state. Furthermore, when the target temperature Sr is changed from a low value to a high value, the valve system 10 switches the flow state of the fluid F to the third state and the sixth state. With this control, the tank temperature $T_p$ is adjusted to the target temperature Sr. By supplying a large amount of fluid F of the second temperature $T_2$ from the high temperature control unit 7 to the tank 2, the tank temperature $T_p$ is adjusted to the target temperature Sr in a short time. Since the flow state of the fluid F is switched to the sixth state, the overflow of the fluid F from the tank 2 would be suppressed even when a large amount of fluid F is supplied from the high temperature control unit 7 to the tank 2 in the third state.

Fourth Embodiment

A fourth embodiment will be described. In the following description, the same or equivalent components as those in the above-described embodiment are designated by the same reference numerals, and the description thereof will be simplified or omitted.

[Temperature Control System]

Figure 12:
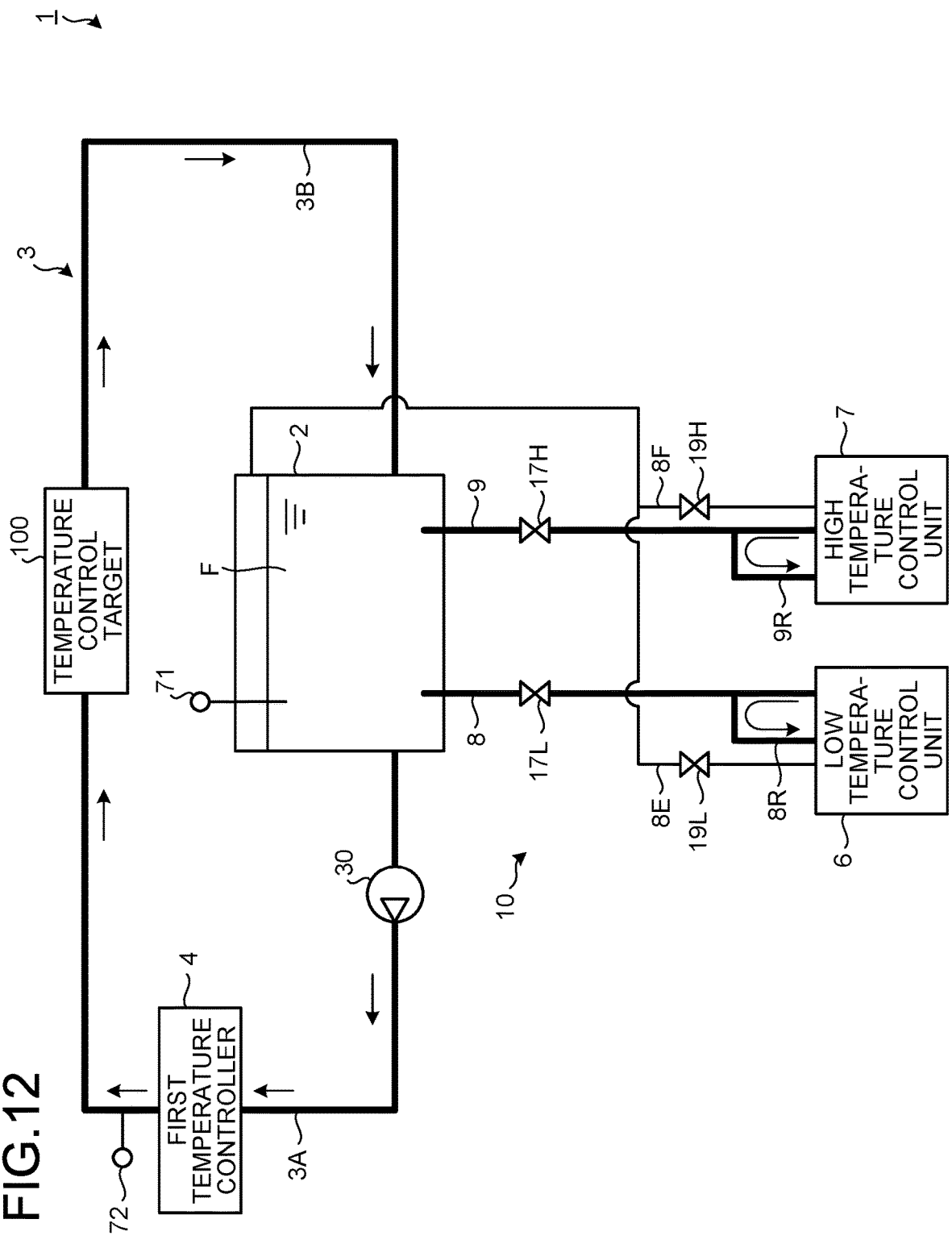
FIG. 12 is a configuration diagram illustrating a temperature control system according to a fourth embodiment.
Figure 13:
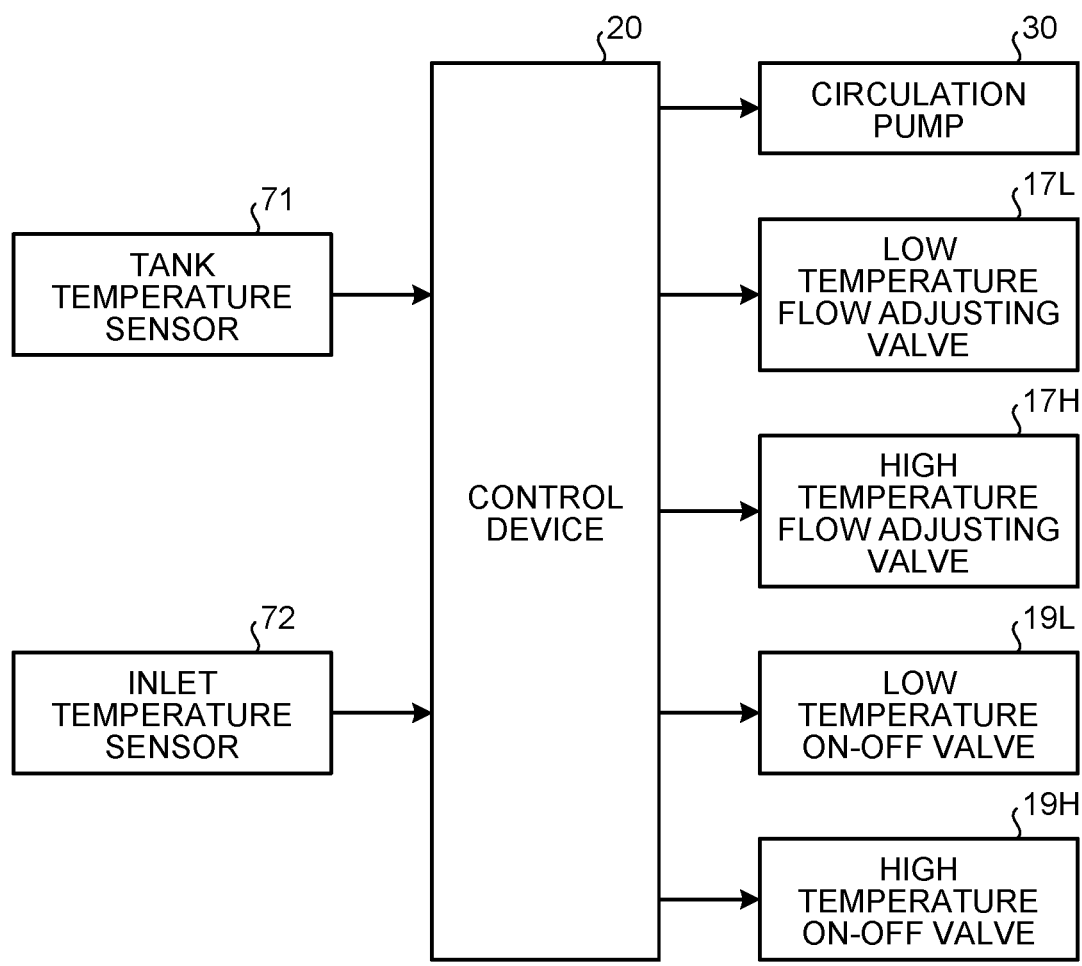
FIG. 13 is a block diagram illustrating the temperature control system according to the fourth embodiment.

FIG. 12 is a configuration diagram illustrating a temperature control system 1 according to the present embodiment. FIG. 13 is a block diagram illustrating the temperature control system 1 according to the present embodiment. As illustrated in FIGS. 12 and 13, the temperature control system 1 is equipped with: a circulation channel 3 including a temperature control target 100 and a tank 2; and a first temperature controller 4 that adjusts the temperature of a fluid F supplied to the temperature control target 100.

Furthermore, the temperature control system 1 includes a low temperature control unit 6 that stores the fluid F at a first temperature $T_1$, a high temperature control unit 7 that stores the fluid F at a second temperature $T_2$ higher than the first temperature $T_1$, a low temperature channel 8 through which the fluid F supplied from the low temperature control unit 6 to the tank 2 flows, a high temperature channel 9 through which the fluid F supplied from the high temperature control unit 7 to the tank 2 flows, a valve system 10 capable of switching the flow state of the fluid F so that the fluid F contained in the tank 2 becomes a target temperature Sr, and a control device 20 that controls the temperature control system 1.

The low temperature control unit 6 can deliver the fluid F of the first temperature $T_1$ to the tank 2. An example of the first temperature $T_1$ is −10° C. The high temperature control unit 7 can deliver the fluid F of the second temperature $T_2$ to the tank 2. An example of the second temperature $T_2$ is 90° C.

The low temperature channel 8 connects the low temperature control unit 6 and the tank 2 with each other. The fluid F of the first temperature $T_1$ supplied from the low temperature control unit 6 to the tank 2 flows through the low temperature channel 8.

The high temperature channel 9 connects the high temperature control unit 7 and the tank 2 with each other. The fluid F of the second temperature $T_2$ supplied from the high temperature control unit 7 to the tank 2 flows through the high temperature channel 9.

The valve system 10 is capable of switching the flow state of the fluid F from the low temperature control unit 6 and the high temperature control unit 7 to the tank 2. Furthermore, the valve system 10 is capable of switching the flow state of the fluid F from the tank 2 to the low temperature control unit 6 and the high temperature control unit 7. The valve system 10 is controlled by the control device 20.

Similar to the above-described embodiments, the valve system 10 is capable of switching the flow state between the first state, the second state, and the third state. Furthermore, the valve system 10 is capable of switching the flow state between the fourth state, the fifth state, and the sixth state. The valve system 10 switches the flow state to the fourth state when in the first state, to the fifth state when in the second state, and to the sixth state when in the third state.

The valve system 10 includes a low temperature flow adjusting valve 17L arranged in the low temperature channel 8, a high temperature flow adjusting valve 17H arranged in the high temperature channel 9, a low temperature on-off valve 19L arranged in the first overflow channel 8E, and a high temperature on-off valve 19H arranged in the second overflow channel 8F.

The low temperature flow adjusting valve 17L is controlled by the control device 20. The control device 20 can control the low temperature flow adjusting valve 17L to switch between supplying and stopping the fluid F from the low temperature control unit 6 to the tank 2 and to adjust the flow rate of the fluid F supplied from the low temperature control unit 6 to the tank 2. When the low temperature flow adjusting valve 17L opens, the fluid F of the first temperature $T_1$ is supplied from the low temperature control unit 6 to the tank 2. When the low temperature flow adjusting valve 17L is closed, the supply of the fluid F from the low temperature control unit 6 to the tank 2 is stopped.

The high temperature flow adjusting valve 17H is controlled by the control device 20. The control device 20 can control the high temperature flow adjusting valve 17H to switch between supplying and stopping the fluid F from the high temperature control unit 7 to the tank 2 and to adjust the flow rate of the fluid F supplied from the high temperature control unit 7 to the tank 2. When the high temperature flow adjusting valve 17H opens, the fluid F of the second temperature $T_2$ is supplied from the high temperature control unit 7 to the tank 2. When the high temperature flow adjusting valve 17H is closed, the supply of the fluid F from the high temperature control unit 7 to the tank 2 is stopped.

The low temperature on-off valve 19L is a solenoid valve. When the low temperature on-off valve 19L opens, the fluid F is returned from the tank 2 to the low temperature control unit 6. When the low temperature on-off valve 19L is closed, the fluid F is not to be returned from the tank 2 to the low temperature control unit 6.

The high temperature on-off valve 19H is a solenoid valve. When the high temperature on-off valve 19H opens, the fluid F is returned from the tank 2 to the high temperature control unit 7. When the high temperature on-off valve 19H is closed, the fluid F is not to be returned from the tank 2 to the high temperature control unit 7.

When setting the flow state of the fluid F to the first state, the control device 20 closes the low temperature flow adjusting valve 17L and the high temperature flow adjusting valve 17H individually. With this configuration, the fluid F will not be supplied to the tank 2 either from the low temperature control unit 6 or the high temperature control unit 7.

When setting the flow state of the fluid F to the second state, the control device 20 opens the low temperature flow adjusting valve 17L and closes the high temperature flow adjusting valve 17H. With this setting, the fluid F of the first temperature $T_1$ delivered from the low temperature control unit 6 is supplied to the tank 2 at a specified flow rate via the low temperature channel 8.

When setting the flow state of the fluid F to the third state, the control device 20 opens the high temperature flow adjusting valve 17H and closes the low temperature flow adjusting valve 17L. With this setting, the fluid F of the second temperature $T_2$ delivered from the high temperature control unit 7 is supplied to the tank 2 at a specified flow rate via the high temperature channel 9.

The control device 20 closes both the low temperature on-off valve 19L and the high temperature on-off valve 19H when the flow state of the fluid F is set to the fourth state. With this control, the fluid F is not to be returned from the tank 2 to either the low temperature control unit 6 or the high temperature control unit 7.

The control device 20 opens the low temperature on-off valve 19L and closes the high temperature on-off valve 19H when setting the flow state of the fluid F to the fifth state. With this control, at least a part of the fluid F contained in the tank 2 is returned to the low temperature control unit 6 via the first overflow channel 8E.

When setting the flow state of the fluid F to the sixth state, the control device 20 opens the high temperature on-off valve 19H and closes the low temperature on-off valve 19L. With this control, at least a part of the fluid F contained in the tank 2 is returned to the high temperature control unit 7 via the second overflow channel 8F.

The control device 20 can control the low temperature on-off valve 19L to switch between supplying and stopping the fluid F from the circulation channel 3 to the low temperature control unit 6. Moreover, the control device 20 can control the high temperature on-off valve 19H to switch between supplying and stopping the fluid F from the circulation channel 3 to the high temperature control unit 7. For example, when the amount of the fluid F contained in the tank 2 increases and the fluid F is about to overflow from the tank 2, the control device 20 can control the low temperature on-off valve 19L so as to allow at least a part of the fluid F flowing through the circulation channel 3 to be supplied to the low temperature control unit 6 via the first overflow channel 8E. Note that, when the fluid F is about to overflow from the tank 2, the control device 20 may control the high temperature on-off valve 19H so as to allow at least a part of the fluid F flowing through the circulation channel 3 to be supplied to the high temperature control unit 7 via the second overflow channel 8F. This makes it possible to suppress the overflow of the fluid F from the tank 2.

The first temperature controller 4 adjusts the temperature of the fluid F based on the inlet temperature $T_{in}$. Based on detection data of the inlet temperature sensor 72, the control device 20 controls the drive circuit 45 of the first temperature controller 4 so that the inlet temperature $T_{in}$ of the fluid F to be supplied to the temperature control target 100 becomes the target temperature Sr.

The control device 20 can control the low temperature flow adjusting valve 17L to perform high accuracy control of the temperature of the fluid F supplied from the circulation channel 3 to the temperature control target 100. For example, the temperature of the fluid F supplied from the circulation channel 3 to the temperature control target 100 rises by cooling the temperature control target 100.

With an increased temperature after passing through the temperature control target 100, the fluid F flows through the second portion 3B and is returned to the tank 2. Furthermore, the fluid F flows from the low temperature control unit 6 through the low temperature channel 8 via the low temperature flow adjusting valve 17L and is supplied to the tank 2, thereby allowing the fluid F in the tank 2 to undergo temperature control. The fluid F in the tank 2 flows through the first portion 3A via the circulation pump 30, undergoes temperature control by the first temperature controller 4 with higher accuracy, and is supplied to the temperature control target 100.

[Operations of Valve System]

The valve system 10 switches the flow state of the fluid F to the fourth state when in the first state, switches to the fifth state when in the second state, and switches to the sixth state when in the third state. That is, when the fluid F stored in the low temperature control unit 6 and the fluid F stored in the high temperature control unit 7 are not to be supplied to the tank 2, the fluid F contained in the tank 2 will not be returned to the low temperature control unit 6 or to the high temperature control unit 7. When the fluid F of the first temperature $T_1$ stored in the low temperature control unit 6 is to be supplied to the tank 2, at least a part of the fluid F contained in the tank 2 will be returned to the low temperature control unit 6. When the fluid F of the second temperature $T_2$ higher than the first temperature $T_1$, stored in the high temperature control unit 7, is to be supplied to the tank 2, at least a part of the fluid F contained in the tank 2 will be returned to the high temperature control unit 7.

The valve system 10 switches the flow state between the first state, the second state, and the third state based on the tank temperature $T_p$. Based on the detection data of the tank temperature sensor 71, the control device 20 controls the low temperature flow adjusting valve 17L, the high temperature flow adjusting valve 17H, the low temperature on-off valve 19L, and the high temperature on-off valve 19H.

In the present embodiment, the valve system 10 switches the flow state of the fluid F to the first state and the fourth state when the tank temperature $T_p$ is within the specified temperature range Sm.

As illustrated in FIG. 10, the specified temperature range Sm includes the target temperature Sr of the temperature control target 100. The specified temperature range Sm is a temperature range between an upper limit temperature Smh and a lower limit temperature Sml lower than the upper limit temperature Smh.

That is, when the tank temperature $T_p$ is within the specified temperature range Sm, both the low temperature flow adjusting valve 17L and the high temperature flow adjusting valve 17H will be closed, and supply of the fluid F individually from the low temperature control unit 6 and the high temperature control unit 7 to the tank 2 will be stopped. That is, when the tank temperature $T_p$ is within the specified temperature range Sm, both the low temperature on-off valve 19L and the high temperature on-off valve 19H will closed, and supply of the fluid F individually from the low temperature control unit 6 and the high temperature control unit 7 to the tank 2 will be stopped. When the tank temperature $T_p$ is within the specified temperature range Sm, the fluid F circulates through the circulation channel 3. That is, in the first state and the fourth state, the fluid F circulates through the circulation channel 3. The temperature of the fluid F circulating through the circulation channel 3 is adjusted by the first temperature controller 4.

The valve system 10 switches the flow state of the fluid F to the second state and the fifth state when the tank temperature $T_p$ is in the high temperature range Sh higher than the upper limit temperature Smh of the specified temperature range Sm.

That is, when the tank temperature $T_p$ is in the high temperature range Sh, the low temperature flow adjusting valve 17L opens, the high temperature flow adjusting valve 17H is closed, and the fluid F of the first temperature $T_1$ is supplied from the low temperature control unit 6 to the tank 2. When the tank temperature $T_p$ is in the high temperature range Sh, the fluid F of the first temperature $T_1$ is supplied to the tank 2 so as to adjust the tank temperature $T_p$ to the specified temperature range Sm. The control device 20 controls the low temperature flow adjusting valve 17L so as to increase the flow rate of the fluid F supplied from the low temperature control unit 6 to the tank 2 per unit time, making it possible to adjust the tank temperature $T_p$ in the high temperature range Sh to the specified temperature range Sm in a short time. In addition, in a state where the fluid F of the first temperature $T_1$ is supplied from the low temperature control unit 6 to the tank 2, the low temperature on-off valve 19L opens, the high temperature on-off valve 19H is closed, and the fluid F is returned from the tank 2 to the low temperature control unit 6. This makes it possible to suppress overflow of the fluid F from the tank 2 even when a large amount of fluid F is supplied from the low temperature control unit 6 to the tank 2. Furthermore, by returning the fluid F from the tank 2 to the low temperature control unit 6, it is possible to suppress the decrease of the amount of the fluid F stored in the low temperature tank of the low temperature control unit 6.

The valve system 10 switches the flow state of the fluid F to the third state and the sixth state when the tank temperature $T_p$ is in the low temperature range S1 lower than the lower limit temperature Sml of the specified temperature range Sm.

That is, when the tank temperature $T_p$ is in the low temperature range Sl, the high temperature flow adjusting valve 17H opens, the low temperature flow adjusting valve 17L is closed, and the fluid F of the second temperature $T_2$ is supplied from the high temperature control unit 7 to the tank 2. When the tank temperature $T_p$ is in the low temperature range Sl, the fluid F of the second temperature $T_2$ is supplied to the tank 2 so as to adjust the tank temperature $T_p$ to the specified temperature range Sm. The control device 20 controls the high temperature flow adjusting valve 17H so as to increase the flow rate of the fluid F supplied from the high temperature control unit 7 to the tank 2 per unit time, making it possible to adjust the tank temperature $T_p$ in the low temperature range S1 to the specified temperature range Sm in a short time. Furthermore, in a state where the fluid F of the second temperature $T_2$ is supplied from the high temperature control unit 7 to the tank 2, the high temperature on-off valve 19H opens, the low temperature on-off valve 19L is closed, and the fluid F is returned from the tank 2 to the high temperature control unit 7. This makes it possible to suppress overflow of the fluid F from the tank 2 even when a large amount of fluid F is supplied from the high temperature control unit 7 to the tank 2. Furthermore, by returning the fluid F from the tank 2 to the high temperature control unit 7, it is possible to suppress the decrease of the amount of the fluid F stored in the high temperature tank of the high temperature control unit 7.

[Effects]

As described above, also in the present embodiment, the first overflow channel 8E and the second overflow channel 8F are provided. When the tank temperature $T_p$ is in the high temperature range Sh, the flow state of the fluid F is switched to the second state and the fifth state. When the tank temperature $T_p$ is in the low temperature range S1, the flow state of the fluid F is switched to the third state and the sixth state. The present embodiment has eliminated the three-way valve 18, the first bypass channel 31, the second bypass channel 32, the first on-off valve 15, and the second on-off valve 16 as described in the second embodiment above.

In the present embodiment, the number of components used is reduced and the device configuration is simplified.

Fifth Embodiment

A fifth embodiment will be described. In the following description, the same or equivalent components as those in the above-described embodiment are designated by the same reference numerals, and the description thereof will be simplified or omitted. The fifth embodiment is a modification of the second embodiment described with reference to FIGS. 8, 9 and the like.

[Temperature Control System]

Figure 14:
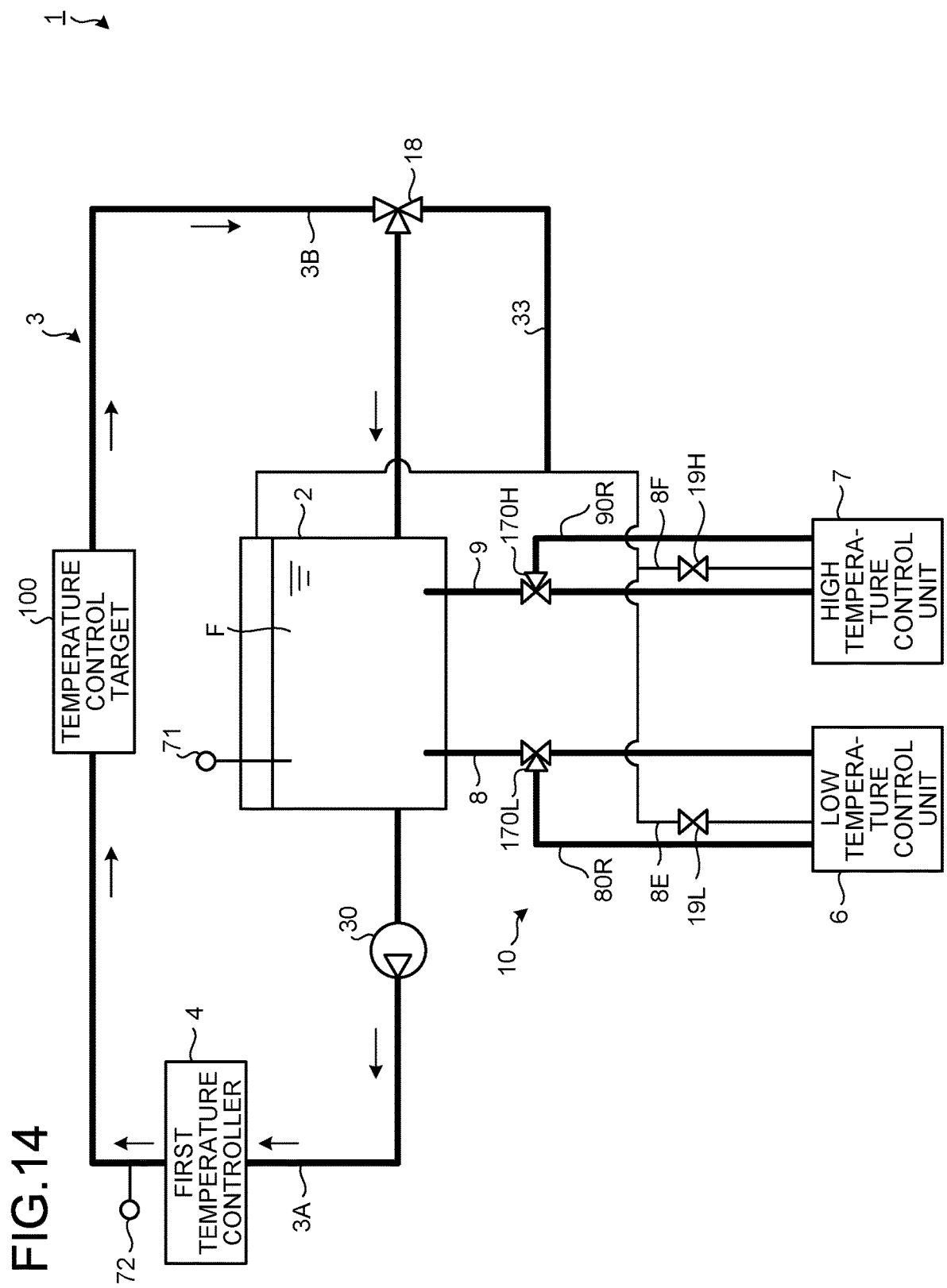
FIG. 14 is a configuration diagram illustrating a temperature control system according to a fifth embodiment.
Figure 15:
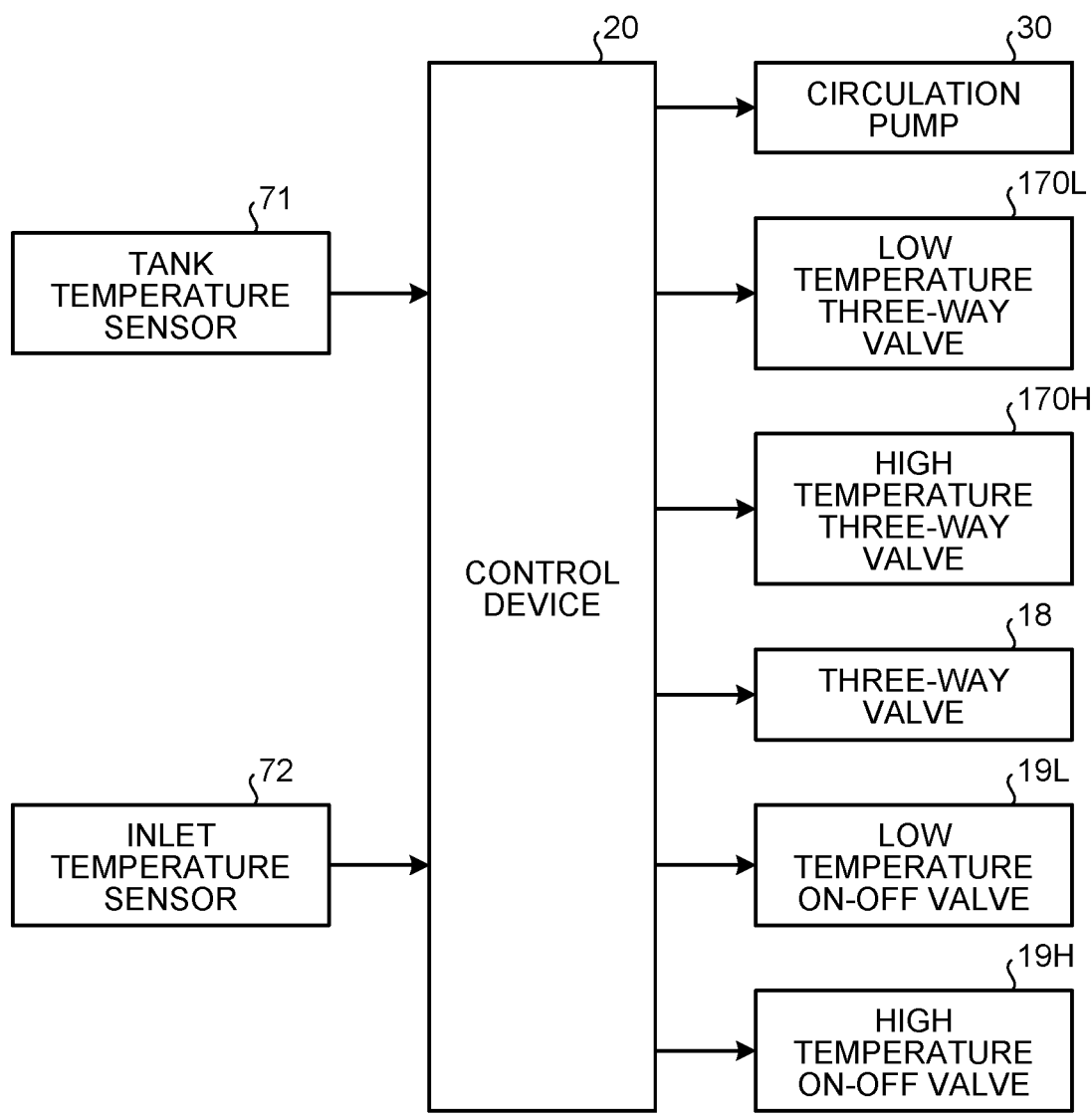
FIG. 15 is a block diagram illustrating the temperature control system according to the fifth embodiment.

FIG. 14 is a configuration diagram illustrating a temperature control system 1 according to the present embodiment. FIG. 15 is a block diagram illustrating the temperature control system 1 according to the present embodiment. As illustrated in FIGS. 14 and 15, the temperature control system 1 is equipped with: a circulation channel 3 including a temperature control target 100 and a tank 2; and a first temperature controller 4 that adjusts the temperature of a fluid F supplied to the temperature control target 100.

Furthermore, the temperature control system 1 includes a low temperature control unit 6 that stores the fluid F at a first temperature $T_1$, a high temperature control unit 7 that stores the fluid F at a second temperature $T_2$ that is higher than the first temperature $T_1$, a low temperature channel 8 through which the fluid F supplied from the low temperature control unit 6 to the tank 2 flows, a high temperature channel 9 through which the fluid F supplied from the high temperature control unit 7 to the tank 2 flows, a first overflow channel 8E through which the fluid F returned from the tank 2 to the low temperature control unit 6 flows, a second overflow channel 8F through which the fluid F returned from the tank 2 to the high temperature control unit 7 flows, a valve system 10 capable of switching the flow state of the fluid F so that the fluid F contained in the tank 2 becomes a target temperature Sr, and a control device 20 that controls the temperature control system 1.

Similar to the above second embodiment, the circulation channel 3 includes a first portion 3A through which the fluid F supplied from the tank 2 to the temperature control target 100 flows, and a second portion 3B through which the fluid F supplied from the temperature control target 100 to the tank 2 flows. The first temperature controller 4 is arranged in the first portion 3A. There is provided a three-way valve 18 arranged in the second portion 3B.

The three-way valve 18 is connected individually to the low temperature control unit 6 and the high temperature control unit 7 via a bypass channel 33. In the present embodiment, the bypass channel 33 connects the three-way valve 18 to the first overflow channel 8E and the second overflow channel 8F.

The three-way valve 18 is controlled by the control device 20. The control device 20 controls the three-way valve 18 to switch between supplying and stopping the fluid F from the temperature control target 100 to the tank 2. When the fluid F is supplied from the temperature control target 100 to the tank 2 by the three-way valve 18, the supply of the fluid F from the circulation channel 3 to the low temperature control unit 6 and the high temperature control unit 7 is stopped. When the supply of the fluid F from the temperature control target 100 to the tank 2 is stopped by the three-way valve 18, the fluid F in the circulation channel 3 can be supplied to the low temperature control unit 6 and the high temperature control unit 7.

The low temperature control unit 6 can deliver the fluid F of the first temperature $T_1$ to the tank 2. An example of the first temperature $T_1$ is $-10°$ C. The high temperature control unit 7 can deliver the fluid F of the second temperature $T_2$ to the tank 2. An example of the second temperature $T_2$ is 90° C.

The low temperature channel 8 connects the low temperature control unit 6 and the tank 2 with each other. The fluid F of the first temperature $T_1$ supplied from the low temperature control unit 6 to the tank 2 flows through the low temperature channel 8.

The high temperature channel 9 connects the high temperature control unit 7 and the tank 2 with each other. The fluid F of the second temperature $T_2$ supplied from the high temperature control unit 7 to the tank 2 flows through the high temperature channel 9.

The first overflow channel 8E connects the upper part of the tank 2 and the low temperature control unit 6 with each other. When the fluid F is supplied from the low temperature control unit 6 to the tank 2 and the fluid F contained in the tank 2 reaches a specified amount, at least a part of the fluid F contained in the tank 2 will be returned to the low temperature control unit 6 via the first overflow channel 8E. The fluid F returned from the tank 2 to the low temperature control unit 6 flows through the first overflow channel 8E. The first overflow channel 8E makes it possible to suppress the overflow of the fluid F contained in the tank 2 from the tank 2 even when the fluid F is supplied from the low temperature control unit 6 to the tank 2.

The second overflow channel 8F connects the upper part of the tank 2 and the high temperature control unit 7 with each other. When the fluid F is supplied from the high temperature control unit 7 to the tank 2 and the fluid F contained in the tank 2 reaches a specified amount, at least a part of the fluid F contained in the tank 2 will be returned to the high temperature control unit 7 via the second overflow channel 8F. The fluid F returned from the tank 2 to the high temperature control unit 7 flows through the second overflow channel 8F. The second overflow channel 8F makes it possible to suppress the overflow of the fluid F contained in the tank 2 from the tank 2 even when the fluid F is supplied from the high temperature control unit 7 to the tank 2.

The valve system 10 is capable of switching the flow state of the fluid F from the low temperature control unit 6 and the high temperature control unit 7 to the tank 2. Furthermore, the valve system 10 is capable of switching the flow state of the fluid F from the tank 2 to the low temperature control unit 6 and the high temperature control unit 7. The valve system 10 is controlled by the control device 20.

Similar to the above-described embodiments, the valve system 10 is capable of switching the flow state between a first state in which the fluid F is not supplied to the tank 2 either from the low temperature control unit 6 or the high temperature control unit 7, a second state in which the fluid F is supplied from the low temperature control unit 6 to the tank 2, and a third state in which the fluid F is supplied from the high temperature control unit 7 to the tank 2. In addition, the valve system 10 can switch the flow state between a fourth state in which the fluid F is not returned from the tank 2 either to the low temperature control unit 6 or the high temperature control unit 7, a fifth state in which the fluid F is returned from the tank 2 to the low temperature control unit 6, and a sixth state in which the fluid F is returned from the tank 2 to the high temperature control unit 7. The valve system 10 switches the flow state to the fourth state when in the first state, to the fifth state when in the second state, and to the sixth state when in the third state.

Similar to the above embodiments, the valve system 10 switches the flow state to the first state and fourth state when the tank temperature $T_p$ indicating the temperature of the fluid F contained in the tank 2 is within the specified temperature range Sm, switches the flow state to the second state and the fifth state when the tank temperature $T_p$ is in the high temperature range Sh higher than the upper limit temperature Smh of the specified temperature range Sm, and switches the flow state to the third state and the sixth state when the tank temperature $T_p$ is in the low temperature range S1 lower than the lower limit temperature Sml of the specified temperature range Sm.

In the present embodiment, the temperature control system 1 includes: a low temperature return channel 80R connecting the low temperature channel 8 with the low temperature control unit 6 between the tank 2 and the low temperature control unit 6; and a high temperature return channel 90R connecting the high temperature channel 9 with the high temperature control unit 7 between the tank 2 and the high temperature control unit 7.

In the first state and the third state, the fluid F delivered from the low temperature control unit 6 is returned to the low temperature control unit 6 via the low temperature return channel 80R. That is, in the first state and the third state, the fluid F circulates through the circulation channel including the low temperature control unit 6 and the low temperature return channel 80R.

In the first state and the second state, the fluid F delivered from the high temperature control unit 7 is returned to the high temperature control unit 7 via the high temperature return channel 90R. That is, in the first state and the second state, the fluid F circulates through the circulation channel including the high temperature control unit 7 and the high temperature return channel 90R.

The valve system 10 includes a low temperature three-way valve 170L arranged in the low temperature channel 8, a high temperature three-way valve 170H arranged in the high temperature channel 9, a low temperature on-off valve 19L arranged in the first overflow channel 8E, and a high temperature on-off valve 19H arranged in the second overflow channel 8F.

The low temperature return channel 80R connects the low temperature three-way valve 170L and the low temperature control unit 6 with each other. The high temperature return channel 90R connects the high temperature three-way valve 170H and the high temperature control unit 7 with each other.

The low temperature three-way valve 170L is controlled by the control device 20. The control device 20 can control the low temperature three-way valve 170L so as to switch between supplying and stopping the fluid F from the low temperature control unit 6 to the tank 2, so as to adjust the flow rate of the fluid F supplied from the low temperature control unit 6 to the tank 2, or so as to return the fluid F delivered from the low temperature control unit 6 to the low temperature control unit 6.

The high temperature three-way valve 170H is controlled by the control device 20. The control device 20 can control the high temperature three-way valve 170H so as to switch between supplying and stopping the fluid F from the high temperature control unit 7 to the tank 2, so as to adjust the flow rate of the fluid F supplied from the high temperature control unit 7 to the tank 2, or so as to return the fluid F delivered from the high temperature control unit 7 to the high temperature control unit 7.

The low temperature on-off valve 19L is an on-off valve. When the low temperature on-off valve 19L opens, the fluid F is returned from the tank 2 to the low temperature control unit 6. When the low temperature on-off valve 19L is closed, the fluid F is not to be returned from the tank 2 to the low temperature control unit 6.

The high temperature on-off valve 19H is an on-off valve. When the high temperature on-off valve 19H opens, the fluid F is returned from the tank 2 to the high temperature control unit 7. When the high temperature on-off valve 19H is closed, the fluid F is not to be returned from the tank 2 to the high temperature control unit 7.

When setting the flow state of the fluid F to the first state, the control device 20 sets the opening degree of the low temperature three-way valve 170L connecting the low temperature control unit 6 with the tank 2 to 0% so that the fluid F would not flow from the low temperature control unit 6 to the tank 2, and sets the opening degree of the high temperature three-way valve 170H connecting the high temperature control unit 7 with the tank 2 to 0% so that the fluid F would not flow from the high temperature control unit 7 to the tank 2. Furthermore, when setting the flow state of the fluid F to the first state, the control device 20 sets the opening degree of the low temperature three-way valve 170L connecting the low temperature channel 8 with the low temperature return channel 80R to 100% so that the fluid F delivered from the low temperature control unit 6 would return to the low temperature control unit 6, and sets the opening degree of the high temperature three-way valve 170H connecting the high temperature channel 9 with the high temperature return channel 90R to 100% so that the fluid F delivered from the high temperature control unit 7 would return to the high temperature control unit 7. With this configuration, the fluid F will not be supplied to the tank 2 either from the low temperature control unit 6 or the high temperature control unit 7.

When setting the flow state of the fluid F to the second state, the control device 20 sets the opening degree of the low temperature three-way valve 170L connecting the low temperature control unit 6 with the tank 2 to 100% so that the fluid F would flow from the low temperature control unit 6 to the tank 2, and sets the opening degree of the high temperature three-way valve 170H connecting the high temperature control unit 7 with the tank 2 to 0% so that the fluid F would not flow from the high temperature control unit 7 to the tank 2. Furthermore, when setting the flow state of the fluid F to the second state, the control device 20 sets the opening degree of the low temperature three-way valve 170L connecting the low temperature channel 8 with the low temperature return channel 80R to 0% so that the fluid F delivered from the low temperature control unit 6 would not return to the low temperature control unit 6, and sets the opening degree of the high temperature three-way valve 170H connecting the high temperature channel 9 with the high temperature return channel 90R to 100% so that the fluid F delivered from the high temperature control unit 7 would return to the high temperature control unit 7. With this setting, the fluid F of the first temperature $T_1$ delivered from the low temperature control unit 6 is supplied to the tank 2 at a specified flow rate via the low temperature channel 8.

When setting the flow state of the fluid F to the third state, the control device 20 sets the opening degree of the high temperature three-way valve 170H connecting the high temperature control unit 7 with the tank 2 to 100% so that the fluid F would flow from the high temperature control unit 7 to the tank 2, and sets the opening degree of the low temperature three-way valve 170L connecting the low temperature control unit 6 with the tank 2 to 0% so that the fluid F would not flow from the low temperature control unit 6 to the tank 2. Furthermore, when setting the flow state of the fluid F to the third state, the control device 20 sets the opening degree of the high temperature three-way valve 170H connecting the high temperature channel 9 with the high temperature return channel 90R to 0% so that the fluid F delivered from the high temperature control unit 7 would not return to the high temperature control unit 7, and sets the opening degree of the low temperature three-way valve 170L connecting the low temperature channel 8 with the low temperature return channel 80R to 100% so that the fluid F delivered from the low temperature control unit 6 would return to the low temperature control unit 6. With this setting, the fluid F of the second temperature $T_2$ delivered from the high temperature control unit 7 is supplied to the tank 2 at a specified flow rate via the high temperature channel 9.

When setting the flow state of the fluid F to the fourth state, the control device 20 closes the low temperature on-off valve 19L and the high temperature on-off valve 19H individually to set the opening degree of the three-way valve 18 connecting the second portion 3B with the first portion 3A to 100% so as to allow the fluid F to flow from the second portion 3B to the first portion 3A, and sets the opening degree of the three-way valve 18 connecting the second portion 3B with the bypass channel 33 to 0% so as not to allow the fluid F to flow from the second portion 3B to the bypass channel 33. With this control, the fluid F is not to be returned from the tank 2 to either the low temperature control unit 6 or the high temperature control unit 7.

When setting the flow state of the fluid F to the fifth state, the control device 20 opens the low temperature on-off valve 19L, closes the high temperature on-off valve 19H, and controls the opening degree of the three-way valve 18 connecting the circulation channel 3 with the bypass channel 33 based on the difference between the temperature of the fluid F within the tank 2 and the target temperature Sr so that a part of the fluid F from the second portion 3B will flow into the tank 2 and a part of the fluid F from the second portion 3B will flow into the bypass channel 33. With this control, at least a part of the fluid F contained in the tank 2 is to be returned to the low temperature control unit 6 via the first overflow channel 8E, and at least a part of the fluid F flowing through the circulation channel 3 is to be returned to the low temperature control unit 6 via the bypass channel 33 and the first overflow channel 8E.

When setting the flow state of the fluid F to the sixth state, the control device 20 opens the high temperature on-off valve 19H, closes the low temperature on-off valve 19L, and controls the opening degree of the three-way valve 18 connecting the circulation channel 3 with the bypass channel 33 based on the difference between the temperature of the fluid F within the tank 2 and the target temperature Sr so that a part of the fluid F from the second portion 3B will flow into the tank 2 and a part of the fluid F from the second portion 3B will flow into the bypass channel 33. With this control, at least a part of the fluid F contained in the tank 2 will be returned to the high temperature control unit 7 via the second overflow channel 8F, and at least a part of the fluid F flowing through the circulation channel 3 will be returned to the high temperature control unit 7 via the bypass channel 33 and the second overflow channel 8F.

The first temperature controller 4 adjusts the temperature of the fluid F based on the inlet temperature $T_{in}$. Based on detection data of the inlet temperature sensor 72, the control device 20 controls the drive circuit 45 of the first temperature controller 4 so that the inlet temperature $T_{in}$ of the fluid F to be supplied to the temperature control target 100 becomes the target temperature Sr.

[Effects] As described above, according to the present embodiment, there is provided the bypass channel 33 connecting the three-way valve 18 to the first overflow channel 8E and the second overflow channel 8F. With this configuration, it is possible to eliminate the first bypass channel 31, the second bypass channel 32, the first on-off valve 15, and the second on-off valve 16 as described with reference to FIG. 8.

Furthermore, according to the present embodiment, the low temperature three-way valve 170L is arranged in the low temperature channel 8, and the high temperature three-way valve 170H is arranged in the high temperature channel 9.

Furthermore, the low temperature three-way valve 170L and the low temperature control unit 6 are connected via the low temperature return channel 80R, while the high temperature three-way valve 170H and the high temperature control unit 7 are connected via the high temperature return channel 90R.

With this configuration, it is possible to eliminate the return channel 8R and the return channel 9R as described with reference to FIG. 8. This makes it possible to increase the maximum flow rate of the fluid F supplied from the low temperature control unit 6 and the high temperature control unit 7 to the tank 2. This improves the temperature control accuracy of the fluid F in the tank 2 and reduces the temperature change time of the fluid F. Furthermore, this reduces the load fluctuation of the low temperature pump of the low temperature control unit 6 and the high temperature pump of the high temperature control unit 7, enhancing the life of the low temperature pump and the high temperature pump.

Sixth Embodiment

A sixth embodiment will be described. In the following description, the same or equivalent components as those in the above-described embodiment are designated by the same reference numerals, and the description thereof will be simplified or omitted. The sixth embodiment is a modification of the fifth embodiment described with reference to FIGS. 14, 15 and the like.

[Temperature Control System]

Figure 16:
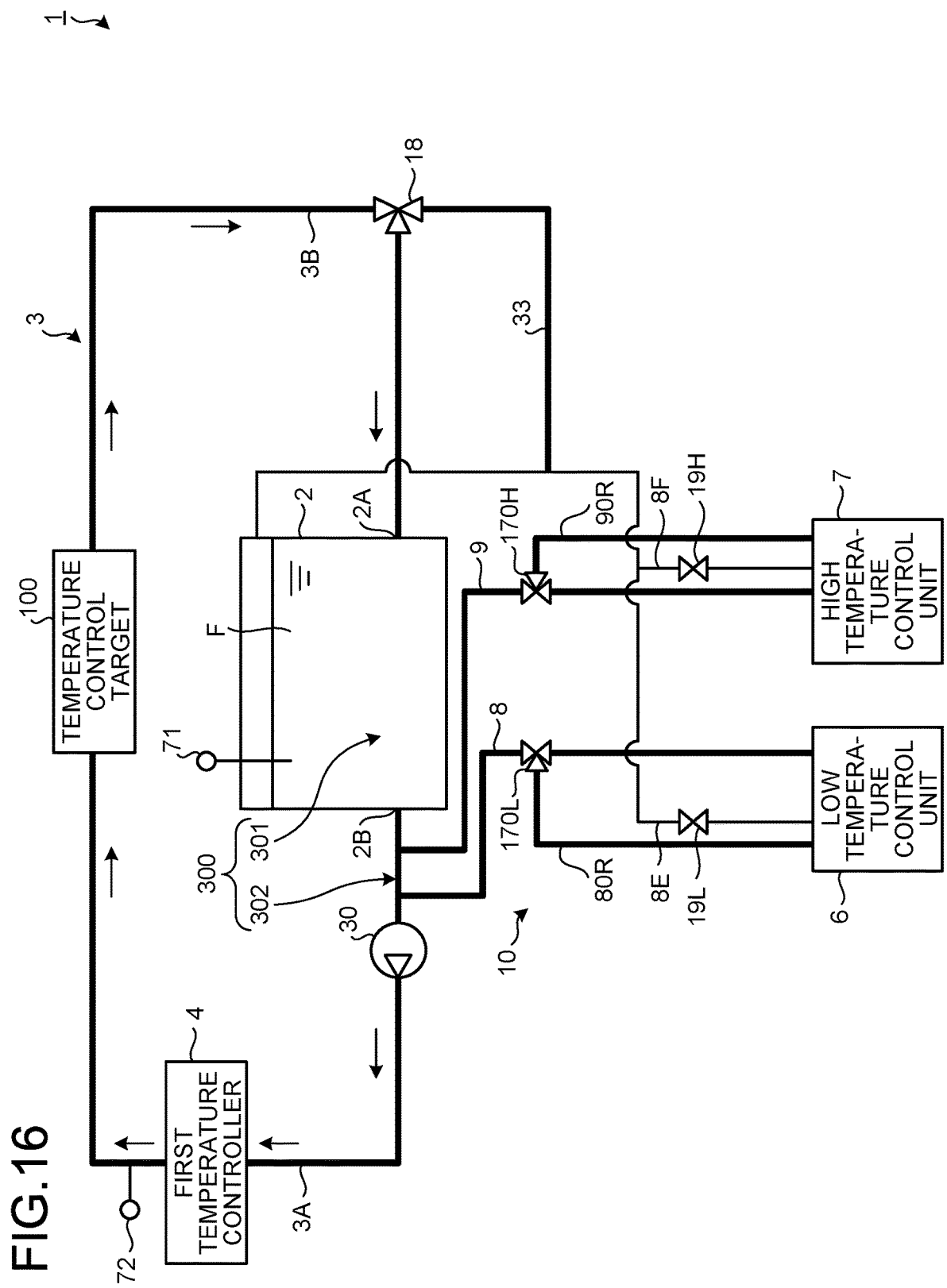
FIG. 16 is a configuration diagram illustrating a temperature control system according to a sixth embodiment.

FIG. 16 is a configuration diagram illustrating a temperature control system 1 according to the present embodiment. In the first to fifth embodiments described above, the low temperature control unit 6 or the high temperature control unit 7 supplies the fluid F to the tank 2. That is, the low temperature channel 8 and the high temperature channel 9 are connected to a first specified portion 301 of the circulation channel 3 between an inflow port 2A and an outflow port 2B of the tank 2. The low temperature control unit 6 or the high temperature control unit 7 may supply the fluid F to a specified portion 300 of the circulation channel 3 between the inflow port 2A of the tank 2 and the first temperature controller 4.

As illustrated in FIG. 16, in the present embodiment, the low temperature control unit 6 or the high temperature control unit 7 is to supply the fluid F to a second specified portion 302 of the circulation channel 3 between the outflow port 2B of the tank 2 and the first temperature controller 4. That is, the low temperature channel 8 and the high temperature channel 9 are to be connected to the second specified portion 302 of the circulation channel 3 between the outflow port 2B of the tank 2 and the first temperature controller 4.

Similar to the above fifth embodiment, the circulation channel 3 includes a first portion 3A through which the fluid F supplied from the tank 2 to the temperature control target 100 flows, and a second portion 3B through which the fluid F supplied from the temperature control target 100 to the tank 2 flows. The first temperature controller 4 is arranged in the first portion 3A. There is provided a three-way valve 18 arranged in the second portion 3B. The second specified portion 302 of the circulation channel 3 is a part of the first portion 3A. The inflow port 2A of the tank 2 is connected to the second portion 3B. The outflow port 2B of the tank 2 is connected to the second specified portion 302 of the first portion 3A.

The low temperature control unit 6 can deliver the fluid F of the first temperature $T_1$ to the second specified portion 302. The high temperature control unit 7 can deliver the fluid F of the second temperature $T_2$ to the second specified portion 302.

The low temperature channel 8 connects the low temperature control unit 6 and the second specified portion 302 with each other. The fluid F of the first temperature $T_1$ supplied from the low temperature control unit 6 to the second specified portion 302 flows through the low temperature channel 8.

The high temperature channel 9 connects the high temperature control unit 7 and the second specified portion 302 with each other. The fluid F of the second temperature $T_2$ supplied from the high temperature control unit 7 to the second specified portion 302 flows through the high temperature channel 9.

The valve system 10 is capable of switching the flow state between a first state in which the fluid F is not supplied to the second specified portion 302 from either the low temperature control unit 6 or the high temperature control unit 7, a second state in which the fluid F is supplied from the low temperature control unit 6 to the second specified portion 302, and a third state in which the fluid F is supplied from the high temperature control unit 7 to the second specified portion 302. In addition, the valve system 10 can switch the flow state between a fourth state in which the fluid F is not returned from the tank 2 either to the low temperature control unit 6 or the high temperature control unit 7, a fifth state in which the fluid F is returned from the tank 2 to the low temperature control unit 6, and a sixth state in which the fluid F is returned from the tank 2 to the high temperature control unit 7. The valve system 10 switches the flow state to the fourth state when in the first state, to the fifth state when in the second state, and to the sixth state when in the third state.

Similar to the above embodiments, the valve system 10 switches the flow state to the first state and the fourth state when the tank temperature $T_p$ indicating the temperature of the fluid F contained in the tank 2 is within the specified temperature range Sm, switches the flow state to the second state and the fifth state when the tank temperature $T_p$ is in the high temperature range Sh higher than the upper limit temperature Smh of the specified temperature range Sm, and switches the flow state to the third state and the sixth state when the tank temperature $T_p$ is in the low temperature range S1 lower than the lower limit temperature Sm1 of the specified temperature range Sm.

In the present embodiment, the low temperature return channel 80R connects the low temperature channel 8 with the low temperature control unit 6, between the second specified portion 302 and the low temperature control unit 6.

The high temperature return channel 90R connects the high temperature channel 9 with the high temperature control unit 7, between the second specified portion 302 and the high temperature control unit 7.

The control device 20 can control the low temperature three-way valve 170L so as to switch between supplying and stopping the fluid F from the low temperature control unit 6 to the second specified portion 302, so as to adjust the flow rate of the fluid F supplied from the low temperature control unit 6 to the second specified portion 302, or so as to return the fluid F delivered from the low temperature control unit 6 to the low temperature control unit 6.

The control device 20 can control the high temperature three-way valve 170H so as to switch between supplying and stopping the fluid F from the high temperature control unit 7 to the second specified portion 302, so as to adjust the flow rate of the fluid F supplied from the high temperature control unit 7 to the second specified portion 302, or so as to return the fluid F delivered from the high temperature control unit 7 to the high temperature control unit 7.

Since the control method for setting the flow state of the fluid F to the first state, the second state, the third state, the fourth state, the fifth state, or the sixth state is similar to the method of the fifth embodiment described above, the description will be omitted.

[Effects]

As described above, according to the present embodiment, the low temperature control unit 6 is connected to the second specified portion 302 of the circulation channel 3 via the low temperature channel 8. The high temperature control unit 7 is connected to the second specified portion 302 of the circulation channel 3 via the high temperature channel 9. The second specified portion 302 is a portion of the circulation channel 3 between the outflow port 2B of the tank 2 and the first temperature controller 4. By supplying the fluid F having an adjusted temperature from the low temperature control unit 6 or the high temperature control unit 7 to the second specified portion 302, the time for changing the temperature of the fluid F flowing through the circulation channel 3 is reduced. With the reduced change time of the temperature of the fluid F, the temperature of the fluid F flowing through the circulation channel 3 can be controlled with high accuracy.

Seventh Embodiment

A seventh embodiment will be described. In the following description, the same or equivalent components as those in the above-described embodiment are designated by the same reference numerals, and the description thereof will be simplified or omitted.

In the first to sixth embodiments described above, the first temperature controller 4 includes the thermoelectric module 60 and is configured to adjust the temperature of the fluid F by using the thermoelectric module 60. The first temperature controller 4 may include a lamp heater and may adjust the temperature of the fluid F by using the lamp heater. When the temperature of the fluid F flowing through the circulation channel 3 exceeds 100 [° C], for example, the durability of the first temperature controller 4 might deteriorates when the first temperature controller 4 uses the thermoelectric module 60 as a heat source. By using a lamp heater as the heat source of the first temperature controller 4, it is possible to suppress deterioration of the durability of the first temperature controller 4 even when the temperature of the fluid F flowing through the circulation channel 3 exceeds 100 [° C], for example.

FIG. 17 is a configuration diagram illustrating a temperature control system 1 according to the present embodiment. The first temperature controller 4 includes a lamp heater. That is, the first temperature controller 4 is a lamp heating temperature controller.

The temperature control system 1 illustrated in FIG. 17 is a modification of the above-described sixth embodiment. As illustrated in FIG. 17, the low temperature control unit 6 supplies the fluid F to the second specified portion 302 of the circulation channel 3 between the outflow port 2B of the tank 2 and the first temperature controller 4.

In the present embodiment, the difference from the sixth embodiment described above is that the high temperature control unit 7 has been eliminated. Furthermore, the difference from the sixth embodiment described above is that the high temperature channel 9, the high temperature return channel 9R, the high temperature three-way valve 170H, the second overflow channel 8F, and the high temperature on-off valve 19H have been eliminated.

With a configuration in which the fluid F in the circulation channel 2 is heated by the first temperature controller 4 which is a lamp heating temperature controller, it is possible to eliminate the high temperature control unit 7. This makes it possible to reduce the cost and space of the temperature control system 1.

Other Embodiments

Note that, similar to the sixth embodiment, it is also allowable in the above-described first to fifth embodiments that the low temperature control unit 6 or the high temperature control unit 7 supplies the fluid F to the second specified portion 302 of the circulation channel 3. Also in the first to fifth embodiments, by supplying the fluid F having an adjusted temperature from the low temperature control unit 6 or the high temperature control unit 7 to the second specified portion 302 on the downstream of the tank 2, it is possible to reduce the time for changing the temperature of the fluid F flowing through the circulation channel 3. With the reduced change time of the temperature of the fluid F, the temperature of the fluid F flowing through the circulation channel 3 can be controlled with high accuracy.

In addition, it is also allowable in the first to sixth embodiments described above to use a lamp heater as the heat source of the first temperature controller 4, as in the seventh embodiment.

Reference Signs List

1 TEMPERATURE CONTROL SYSTEM
2 TANK
2A INFLOW PORT
2B OUTFLOW PORT
3 CIRCULATION CHANNEL
3A FIRST PORTION
3B SECOND PORTION
4 FIRST TEMPERATURE CONTROLLER
5 SECOND TEMPERATURE CONTROLLER
6 LOW TEMPERATURE CONTROL UNIT
7 HIGH TEMPERATURE CONTROL UNIT
8 LOW TEMPERATURE CHANNEL
8A SUPPLY CHANNEL
8B RECOVERY CHANNEL
8C CONNECTION CHANNEL
8D CONNECTION CHANNEL
8E FIRST OVERFLOW CHANNEL
8F SECOND OVERFLOW CHANNEL
8R RETURN CHANNEL
9 HIGH TEMPERATURE CHANNEL
9R RETURN CHANNEL
10 VALVE SYSTEM
11L LOW TEMPERATURE ON-OFF VALVE
11H HIGH TEMPERATURE ON-OFF VALVE
12L LOW TEMPERATURE CONSTANT FLOW VALVE

12H HIGH TEMPERATURE CONSTANT FLOW VALVE
13A HEAT EXCHANGER PROPORTIONAL VALVE
13B HEAT EXCHANGER PROPORTIONAL VALVE
13C HEAT EXCHANGER PROPORTIONAL VALVE
13D HEAT EXCHANGER PROPORTIONAL VALVE
14 CIRCULATION PROPORTIONAL VALVE
15 FIRST ON-OFF VALVE
16 SECOND ON-OFF VALVE
17L LOW TEMPERATURE FLOW ADJUSTING VALVE
17H HIGH TEMPERATURE FLOW ADJUSTING VALVE
18 THREE-WAY VALVE
19L LOW TEMPERATURE ON-OFF VALVE
19H HIGH TEMPERATURE ON-OFF VALVE
20 CONTROL DEVICE
30 CIRCULATION PUMP
31 FIRST BYPASS CHANNEL
32 SECOND BYPASS CHANNEL
33 BYPASS CHANNEL
40 MAIN BODY MEMBER
41 INLET
42 TEMPERATURE CONTROL CHANNEL
43 OUTLET
44 HEAT EXCHANGE PLATE
45 DRIVE CIRCUIT
50 TEMPERATURE CONTROL SECTION
51 CASE
60 THERMOELECTRIC MODULE
61 FIRST ELECTRODE
62 SECOND ELECTRODE
63 THERMOELECTRIC SEMICONDUCTOR ELEMENT
63P p-TYPE THERMOELECTRIC SEMICONDUCTOR ELEMENT
63N n-TYPE THERMOELECTRIC SEMICONDUCTOR ELEMENT
71 TANK TEMPERATURE SENSOR
72 INLET TEMPERATURE SENSOR
73 OUTLET TEMPERATURE SENSOR
74 FLUID AMOUNT SENSOR
80R LOW TEMPERATURE RETURN CHANNEL
90R HIGH TEMPERATURE RETURN CHANNEL
100 TEMPERATURE CONTROL TARGET
170L LOW TEMPERATURE THREE-WAY VALVE
170H HIGH TEMPERATURE THREE-WAY VALVE
300 SPECIFIED PORTION
301 FIRST SPECIFIED PORTION
302 SECOND SPECIFIED PORTION
F FLUID
Sh HIGH TEMPERATURE RANGE
Sl LOW TEMPERATURE RANGE
Sm SPECIFIED TEMPERATURE RANGE
Smh UPPER LIMIT TEMPERATURE
Sml LOWER LIMIT TEMPERATURE
Sr TARGET TEMPERATURE
$T_{in}$ INLET TEMPERATURE
$T_{out}$ OUTLET TEMPERATURE
$T_p$ TANK TEMPERATURE

The invention claimed is:

1. A temperature control system comprising:
a circulation channel including a temperature control target and a tank, the tank accommodating a fluid configured to be adjusted to a specified temperature range including a target temperature of the temperature control target;
a first temperature controller that is arranged between the tank and the temperature control target in the circulation channel and configured to adjust a temperature of the fluid to be supplied to the temperature control target
a low temperature control unit configured to store the fluid having a first temperature;
a high temperature control unit configured to store the fluid having a second temperature higher than the first temperature;
a low temperature channel configured to supply the fluid from the low temperature control unit to a specified portion of the circulation channel between an inflow port of the tank and the first temperature controller;
a high temperature channel configured to supply the fluid from the high temperature control unit to the specified portion; and
a valve system configured to switch a flow state of the fluid among (i) a first state in which the fluid is not supplied from either the low temperature control unit or the high temperature control unit to the specified portion, (ii) a second state in which the fluid is supplied from the low temperature control unit to the specified portion, and (iii) a third state in which the fluid is supplied from the high temperature control unit to the specified portion.

2. The temperature control system according to claim 1, wherein the valve system is configured to:
switch the flow state to the first state based on a tank temperature indicating a temperature of the fluid contained in the tank being within the specified temperature range; and
switch the flow state to at least one of the second state or the third state based on the tank temperature being outside of the specified temperature range.

3. The temperature control system according to claim 1, wherein the fluid circulates through the circulation channel in the first state.

4. The temperature control system according to claim 1, further comprising:
a second temperature controller that is arranged between the temperature control target and the tank in the circulation channel and configured to adjust the temperature of the fluid to be supplied to the tank,
wherein the second temperature controller is configured to adjust a temperature of the fluid based on a difference between an inlet temperature of the fluid flowing into the temperature control target and an outlet temperature of the fluid flowing out of the temperature control target.

5. The temperature control system according to claim 1, further comprising:
a first overflow channel configured to supply the fluid from the tank to the low temperature control unit; and
a second overflow channel configured to supply the fluid to from the tank to the high temperature control unit;
wherein the valve system is configured to switch the flow state among (i) the first state in which the fluid is not supplied from either the low temperature control unit or the high temperature control unit to the specified portion, (ii) the second state in which the fluid is supplied from the low temperature control unit to the specified portion, (iii) the third state in which the fluid is supplied from the high temperature control unit to the specified portion, (iv) a fourth state in which the fluid is not returned from the tank to either the low temperature control unit or the high temperature control unit, (v) a fifth state in which the fluid is returned from the tank to the low temperature control unit, and (vi) a sixth state in which the fluid is returned from the tank to the high temperature control unit, and wherein the valve system is configured to:
switch the flow state to the fourth state based on the flow state being in the first state,
switch the flow state to the fifth state based on the flow state being in the second state, and
switch the flow state to the sixth state based on the flow state being in the third state.

6. The temperature control system according to claim 5, wherein the valve system switches the flow state to the first state and the fourth state when a tank temperature indicating a temperature of the fluid contained in the tank is within the specified temperature range, switches the flow state to the second state and the fifth state when the tank temperature is in a high temperature range higher than an upper limit temperature of the specified temperature range, and switches the flow state to the third state and the sixth state when the tank temperature is in a low temperature range lower than a lower limit temperature of the specified temperature range.

7. The temperature control system according to claim 6, wherein the target temperature includes a first target temperature and a second target temperature higher than the first target temperature,
the valve system switches the flow state to the second state and the fifth state when the target temperature has been switched to the first target temperature, and
the valve system switches the flow state to the third state and the sixth state when the target temperature has been switched to the second target temperature.

8. The temperature control system according to claim 5, wherein the fluid circulates in the circulation channel in the first state and the fourth state.

9. The temperature control system according to claim 5, wherein:
the circulation channel includes a first portion through which the fluid supplied from the tank to the temperature control target flows, and a second portion through which the fluid supplied from the temperature control target to the tank flows;
the first temperature controller is arranged in the first portion;
a three-way valve is arranged in the second portion; and
the temperature control system further comprises a bypass channel that connects the three-way valve to the first overflow channel and the second overflow channel.

10. The temperature control system according to claim 9, further comprising:
a low temperature three-way valve arranged in the low temperature channel;
a high temperature three-way valve arranged in the high temperature channel;
a low temperature return channel connecting the low temperature three-way valve and the low temperature control unit with each other; and
a high temperature return channel connecting the high temperature three-way valve and the high temperature control unit with each other.

11. A temperature control method comprising:
detecting a tank temperature, which indicates a temperature of a fluid contained in a tank, in a circulation channel including a temperature control target and the tank;
adjusting the temperature of the fluid to be supplied to the temperature control target by using a first temperature controller arranged in the circulation channel while circulating the fluid through the circulation channel when the tank temperature is within a specified temperature range including a target temperature of the temperature control target; and
supplying, when the tank temperature is not within the specified temperature range, at least one of the fluid stored in a low temperature control unit and having a first temperature and the fluid stored in a high temperature control unit and having a second temperature higher than the first temperature, to a specified portion of the circulation channel between an inflow port of the tank and the first temperature controller so as to adjust the tank temperature to the specified temperature range.

12. The temperature control method according to claim 11, further comprising:
supplying at least one of the fluid of the first temperature and the fluid of the second temperature higher than the first temperature to a second temperature controller arranged in the circulation channel so as to adjust the temperature of the fluid to be supplied from the second temperature controller to the tank,
wherein an outlet temperature indicating a temperature of the fluid that flows out of the temperature control target and before being supplied to the second temperature controller is higher than an inlet temperature indicating a temperature of the fluid that flows into the temperature control target after undergoing temperature adjustment performed by the first temperature controller, and
wherein the fluid of the first temperature is supplied to the second temperature controller.

13. The temperature control method according to claim 11, further comprising:
supplying at least one of the fluid of the first temperature and the fluid of the second temperature higher than the first temperature to a second temperature controller arranged in the circulation channel so as to adjust the temperature of the fluid to be supplied from the second temperature controller to the tank,
wherein an outlet temperature indicating a temperature of the fluid that flows out of the temperature control target and before being supplied to the second temperature controller is lower than an inlet temperature indicating a temperature of the fluid that flows into the temperature control target after undergoing temperature adjustment performed by the first temperature controller, and
wherein the fluid of the second temperature is supplied to the second temperature controller when a difference between the outlet temperature and the inlet temperature is greater than zero.

14. A temperature control method according comprising:
detecting a tank temperature, which indicates a temperature of a fluid contained in a tank, in a circulation channel including a temperature control target and the tank;
adjusting the temperature of the fluid to be supplied to the temperature control target by using a first temperature controller arranged in the circulation channel while circulating the fluid through the circulation channel when the tank temperature is within a specified temperature range including a target temperature of the temperature control target,
wherein, when the fluid stored in a low temperature control unit and having a first temperature is supplied to a specified portion of the circulation channel between an inflow port of the tank and the first temperature controller, at least a part of the fluid stored in the tank is returned to the low temperature control unit, and wherein, when the fluid stored in a high temperature control unit and having a second temperature higher than the first temperature is supplied to the specified portion, at least a part of the fluid contained in the tank is returned to the high temperature control unit.

15. The temperature control method according to claim 14, wherein the target temperature includes a first target temperature and a second target temperature higher than the first target temperature, wherein, when the target temperature has been switched to the first target temperature, the fluid of the first temperature is supplied to the specified portion, and at least a part of the fluid contained in the tank is returned to the low temperature control unit, and wherein, when the target temperature has been switched to the second target temperature, the fluid of the second temperature is supplied to the specified portion, and at least a part of the fluid contained in the tank is returned to the high temperature control unit.

* * * * *